United States Patent
Bi et al.

(10) Patent No.: US 9,578,299 B2
(45) Date of Patent: Feb. 21, 2017

(54) STEREOSCOPIC CONVERSION FOR SHADER BASED GRAPHICS CONTENT

(75) Inventors: Ning Bi, San Diego, CA (US); Xuerui Zhang, San Diego, CA (US); Jian Wei, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 954 days.

(21) Appl. No.: 13/350,467

(22) Filed: Jan. 13, 2012

(65) Prior Publication Data

US 2012/0235999 A1 Sep. 20, 2012

Related U.S. Application Data

(60) Provisional application No. 61/474,638, filed on Apr. 12, 2011, provisional application No. 61/452,289, filed on Mar. 14, 2011.

(51) Int. Cl.
| | |
|---|---|
| G06T 15/50 | (2011.01) |
| H04N 13/00 | (2006.01) |
| G06T 15/00 | (2011.01) |
| G06T 15/10 | (2011.01) |
| G06T 15/30 | (2011.01) |
| H04N 13/02 | (2006.01) |

(Continued)

(52) U.S. Cl.
CPC ......... *H04N 13/0018* (2013.01); *G06T 15/005* (2013.01); *G06T 15/10* (2013.01); *G06T 15/30* (2013.01); *H04N 13/0275* (2013.01); *H04N 13/0285* (2013.01); *G06T 15/06* (2013.01); *G06T 15/50* (2013.01); *G06T 15/506* (2013.01); *G06T 15/60* (2013.01); *G06T 15/80* (2013.01)

(58) Field of Classification Search
USPC ......................................................... 345/426
See application file for complete search history.

(56) References Cited

U.S. PATENT DOCUMENTS

| | | | |
|---|---|---|---|
| 6,104,405 A | 8/2000 | Idaszak et al. | |
| 6,496,183 B1 | 12/2002 | Bar-Nahum | |

(Continued)

FOREIGN PATENT DOCUMENTS

| | | |
|---|---|---|
| CN | 1277698 A | 12/2000 |
| EP | 1953702 A2 | 8/2008 |

(Continued)

OTHER PUBLICATIONS

Ramirez (Ramirez, A.A.; Lumbreras, M., "Obtaining Stereographics Using a Two-Monitor System and a Set of Mirrors," in Electronics, Communications and Computers, 2008. CONIELECOMP 2008, 18th International Conference on, vol., no., pp. 177-181, Mar. 3-5, 2008).*

(Continued)

*Primary Examiner* — Abderrahim Merouan
(74) *Attorney, Agent, or Firm* — Shumaker & Sieffert, P.A.

(57) ABSTRACT

The example techniques of this disclosure are directed to generating a stereoscopic view from an application designed to generate a mono view. For example, the techniques may modify source code of a vertex shader to cause the modified vertex shader, when executed, to generate graphics content for the images of the stereoscopic view. As another example, the techniques may modify a command that defines a viewport for the mono view to commands that define the viewports for the images of the stereoscopic view.

38 Claims, 4 Drawing Sheets

(51) Int. Cl.
*G06T 15/60* (2006.01)
*G06T 15/80* (2011.01)
*G06T 15/06* (2011.01)

(56) References Cited

U.S. PATENT DOCUMENTS

| | | | |
|---|---|---|---|
| 6,798,409 | B2 | 9/2004 | Thomas et al. |
| 6,888,540 | B2 | 5/2005 | Allen |
| 7,884,823 | B2 | 2/2011 | Bertolami et al. |
| 8,004,515 | B1 * | 8/2011 | Cook et al. ............ G03B 35/00 345/419 |
| 2002/0154214 | A1 | 10/2002 | Scallie et al. |
| 2004/0085310 | A1 | 5/2004 | Snuffer |
| 2004/0179262 | A1 | 9/2004 | Harman et al. |
| 2004/0212612 | A1 | 10/2004 | Epstein et al. |
| 2008/0007559 | A1 * | 1/2008 | Kalaiah et al. ............... 345/501 |
| 2008/0018732 | A1 | 1/2008 | Moller |
| 2008/0062197 | A1 | 3/2008 | Bi et al. |
| 2008/0165181 | A1 | 7/2008 | Wang et al. |
| 2008/0309660 | A1 | 12/2008 | Bertolami et al. |
| 2009/0002380 | A1 * | 1/2009 | Langyel et al. ............. 345/522 |
| 2009/0231329 | A1 | 9/2009 | Swaminathan et al. |
| 2009/0231331 | A1 * | 9/2009 | Holland ........................ 345/419 |
| 2010/0245356 | A1 | 9/2010 | Gateau |
| 2011/0063285 | A1 | 3/2011 | Hoover et al. |
| 2011/0164034 | A1 | 7/2011 | Bennett et al. |
| 2011/0210966 | A1 | 9/2011 | Lee |
| 2011/0310982 | A1 | 12/2011 | Yang et al. |
| 2012/0114200 | A1 | 5/2012 | Akhriev et al. |

FOREIGN PATENT DOCUMENTS

| | | |
|---|---|---|
| JP | 11073523 A | 3/1999 |
| JP | 2002519792 A | 7/2002 |
| JP | 2007141156 A | 6/2007 |
| JP | 2007538427 A | 12/2007 |
| JP | 2009064355 A | 3/2009 |
| JP | 2009064356 A | 3/2009 |
| JP | 2009223889 A | 10/2009 |
| JP | 4836814 B2 | 12/2011 |
| WO | 0000934 A2 | 1/2000 |
| WO | 2004049262 A1 | 6/2004 |
| WO | 2005112474 A2 | 11/2005 |
| WO | WO 2007017834 A2 * | 2/2007 |
| WO | 2008086049 | 7/2008 |
| WO | WO2010139984 A1 | 12/2010 |
| WO | 2011013030 A1 | 2/2011 |

OTHER PUBLICATIONS

U.S. Appl. No. 13/418,206, by Ning Bi, filed Mar. 12, 2012.
Akka, "Converting Existing Applications to Support high quality stereoscopy," Proceedings of SPIE vol. 3639, Jan. 25, 1999, pp. 290-299.
Blythe, "Rise of the Graphics Processor," Proceedings of the IEEE, vol. 96, No. 5, May 2008, pp. 761-778.
Blythe, "The Direct3D 10 System", Proceeding SIGGRAPH '06 ACM SIGGRAPH 2006 Papers, Jul. 30, 2006-Aug. 3, 2006, pp. 724-734.
Carrozzo et al., "Geometric transformations for displaying virtual objects on stereoscopic devices", Computers and Graphics, May 1, 1997, pp. 329-334, vol. 21, No. 3.
Hitchner et al., "Viewing and Projections", Lecture Notes, Jan. 1, 2005, The University of Auckland Retrieved from the Internet: URL:htp://www.cs.auckland.ac.nz/compsci372s1c/yenLectures/ViewingAndProjection4up.pdf [retrieved on Jun. 12, 2012], 15 pp.
International Search Report and Written Opinion—PCT/US2012/028749—ISA/EPO—Jul. 31, 2012, 14 pp.
Kilgariffe et al., "GPU Gems, The GeForce 6 Series GPU Architecture" , Jan. 1, 2005, GPU Gems—Programming Techniques for High-Performance Graphics and General-Purpose Computation, pp. 471-491.
Montrym et al., "The Geforce 6800", IEEE Micro, IEEE Service Center, vol. 25, No. 2, Mar. 1, 2005, pp. 41-51.
Shreiner et al., "Appendix F—Homogeneous Coordinates and Transformation Matrices" In: OpenGL Architecture Review Board: "OpenGL programming Guide, Fourth Edition, The Official Guide to Learning OpenGL, version 1.4", Nov. 13, 2003, pp. 697-703.
Reply to Written Opinion dated Jul. 31, 2012, from international application No. PCT/US2012/028749, filed Jan. 14, 2013, 6 pp.
Drivers for Windows, NVIDIA 3D Stereo User's Guide (for Detonator XP), Revision 2.0, NVIDIA Corporation, Nov. 8, 2001, 51 pp.
NVIDIA 3D Vision Automatic, Best Practices Guide, NVIDIA Corporation, Jul. 2010, 31 pp.
Second Written Opinion of international application No. PCT/US2012/028749, dated Mar. 12, 2013, 7 pp.
International Preliminary Report on Patentability from international application No. PCT/US2012/028749, dated Jul. 3, 2013, 12 pp.

* cited by examiner

STEREOSCOPIC CONVERSION FOR SHADER BASED GRAPHICS CONTENT

This application claims the benefit of U.S. Provisional Application No. 61/452,289, filed Mar. 14, 2011, and U.S. Provisional Application No. 61/474,638, filed Apr. 12, 2011, the contents of each is hereby incorporated by reference in its respective entirety.

TECHNICAL FIELD

This disclosure relates to graphics data processing, and more particularly, to graphics data processing for stereoscopic view.

BACKGROUND

Stereoscopic view refers to a perceived image that appears to encompass a 3-dimensional (3D) volume. To generate the stereoscopic view, a device displays two images on a 2-dimensional (2D) area of a display. These two images include substantially similar content, but with slight displacement along the horizontal axis of one or more corresponding pixels in the two images. The simultaneous viewing of these two images, on a 2D area, causes a viewer to perceive an image that is popped out of or pushed into the 2D display that is displaying the two images. In this way, although the two images are displayed on the 2D area of the display, the viewer perceives an image that appears to encompass the 3D volume.

The two images of the stereoscopic view are referred to as a left-eye image and a right-eye image, respectively. The left-eye image is viewable by the left eye of the viewer, and the right-eye image is not viewable by the left eye of the viewer. Similarly, the right-eye image is viewable by the right eye of the viewer, and the left-eye image is not viewable by the right eye of the viewer. For example, the viewer may wear specialized glasses, where the left lens of the glasses blocks the right-eye image and passes the left-eye image, and the right lens of the glasses blocks the left-eye image and passes the right-eye image.

Because the left-eye and right-eye images include substantially similar content with slight displacement along the horizontal axis, but are not simultaneously viewable by both eyes of the viewer (e.g., because of the specialized glasses), the brain of the viewer resolves the slight displacement between corresponding pixels by commingles the two images. The commingling causes the viewer to perceive the two images as an image with 3D volume.

SUMMARY

In general, the techniques of this disclosure are directed to modifying instructions that generate a mono view to generate a stereoscopic view. For example, a shader program of a graphics processing unit (GPU) may be designed to generate a mono view. The techniques described in this disclosure may modify the instructions of such a shader program. For instance, the example techniques may add instructions that modify values generated by the shader programs. The techniques may also modify instructions issued by an application to cause a GPU to generate images for stereoscopic view instead of mono view. For example, the techniques described in this disclosure may modify commands that define a viewport. A viewport may define the size and location of the image on the display. For example, prior to modification, a command may define a viewport for a mono view. The example techniques may modify the command that define a viewport for a mono view to define a viewport for each of the images of the stereoscopic view.

In one example, this disclosure describes a method that includes receiving, with a processor, instructions for a vertex shader that is configured to generate an image of a mono view and that is to be executed on a shader processor of a graphics processing unit (GPU). The method also includes modifying, with the processor, the instructions of the vertex shader to include one or more instructions that cause the vertex shader, when executed on the shader processor of the GPU, to generate graphics content for a first image of a stereoscopic view after a first execution of the vertex shader, and graphics content for a second image of the stereoscopic view after a second execution of the vertex shader. The method further includes modifying, with the processor, a command that defines a viewport for the image of the mono view to a first command, for a fixed-function unit of the GPU that is different from the shader processor, that defines a viewport for the first image, and a second command, for the fixed-function unit of the GPU, that defines a viewport for the second image.

In another example, this disclosure describes an apparatus that includes a graphics processing unit (GPU) that includes a shader processor and a fixed-function unit, different from the shader processor, of a fixed-function pipeline, and a processor. The processor is operable to receive instructions for a vertex shader that is configured to generate an image of a mono view and that is to be executed on the shader processor of GPU. The processor is also operable to modify the instructions of the vertex shader to include one or more instructions that cause the vertex shader, when executed on the shader processor of the GPU, to generate graphics content for a first image of a stereoscopic view after a first execution of the vertex shader, and graphics content for a second image of the stereoscopic view after a second execution of the vertex shader. The processor is further operable to modify a command that defines a viewport for the image of the mono view to a first command, for the fixed-function unit of the GPU that is different from the shader processor, that defines a viewport for the first image, and a second command, for the fixed-function unit of the GPU, that defines a viewport for the second image.

In another example, this disclosure describes an apparatus that includes a graphics processing unit (GPU) that includes a shader processor and a fixed-function unit, different from the shader processor, of a fixed-function pipeline, and a processor. The processor includes means for receiving instructions for a vertex shader that is configured to generate an image of a mono view and that is to be executed on the shader processor of the GPU. The processor also includes means for modifying the instructions of the vertex shader to include one or more instructions that cause the vertex shader, when executed on the shader processor of the GPU, to generate graphics content for a first image of a stereoscopic view after a first execution of the vertex shader, and graphics content for a second image of the stereoscopic view after a second execution of the vertex shader. The processor further includes means for modifying a command that defines a viewport for the image of the mono view to a first command, for a fixed-function unit of the GPU that is different from the shader processor, that defines a viewport for the first image, and a second command, for the fixed-function unit of the GPU, that defines a viewport for the second image.

In another example, this disclosure describes a non-transitory computer-readable storage medium comprising instructions. The instructions, when executed, cause one or more processors to receive instructions for a vertex shader that is configured to generate an image of a mono view and that is to be executed on a shader processor of a graphics processing unit (GPU). The instructions also cause the one or more processors to modify the instructions of the vertex shader to include one or more instructions that cause the vertex shader, when executed on the shader processor of the GPU, to generate graphics content for a first image of a stereoscopic view after a first execution of the vertex shader, and graphics content for a second image of the stereoscopic view after a second execution of the vertex shader. The instructions also cause the one or more processors to modify a command that defines a viewport for the image of the mono view to a first command, for a fixed-function unit of the GPU that is different from the shader processor, that defines a viewport for the first image, and a second command, for the fixed-function unit of the GPU, that defines a viewport for the second image.

The details of one or more aspects of the disclosure are set forth in the accompanying drawings and the description below. Other features, objects, and advantages of the disclosure will be apparent from the description and drawings, and from the claims.

DETAILED DESCRIPTION

Figure 1:
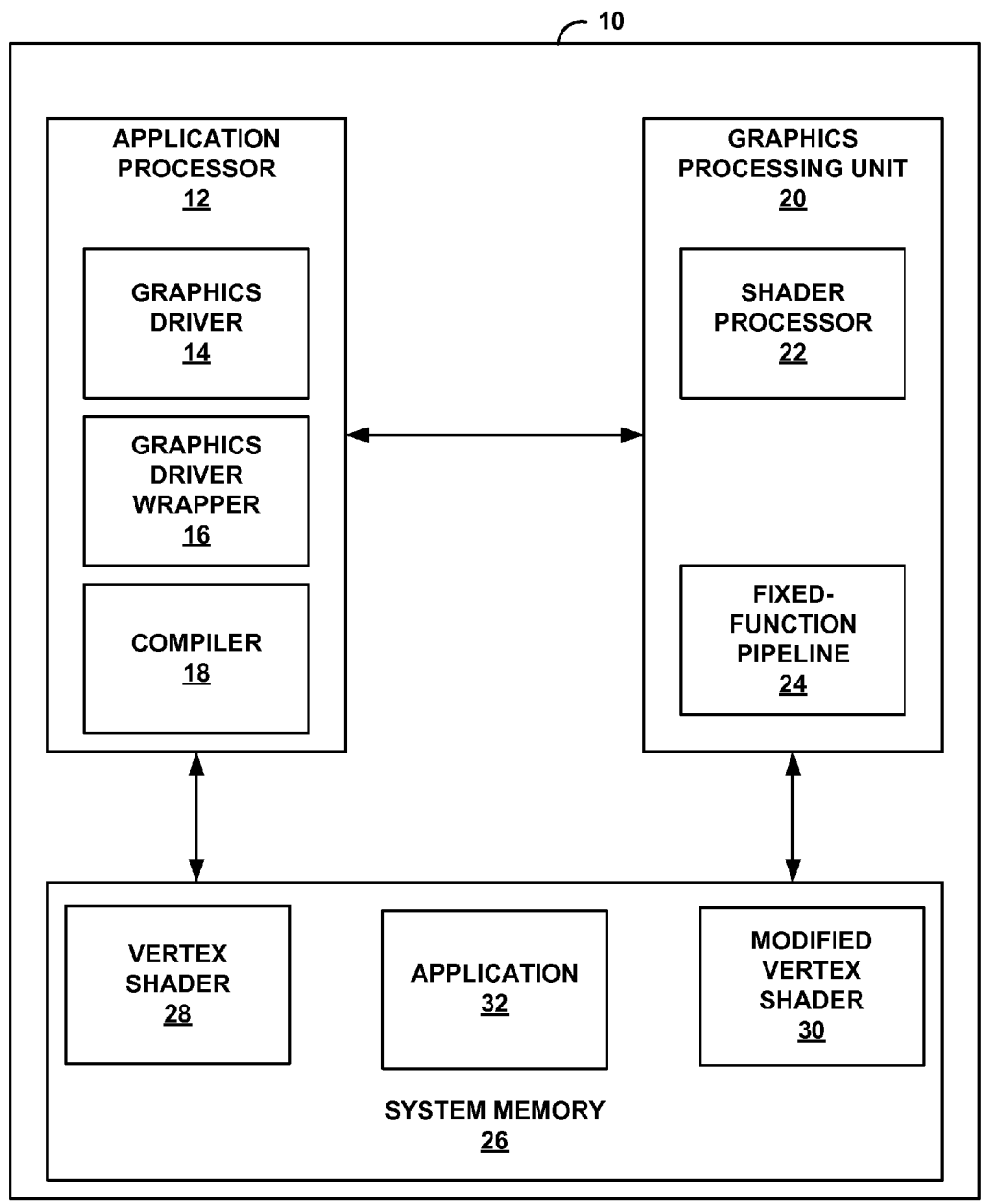
FIG. 1 is a block diagram illustrating an example of a device that may implement one or more example techniques described in this disclosure.

The example techniques described in this disclosure are directed to rendering stereoscopic 3-dimensional (S3D) graphics during execution or run time. In conventional 3D graphics rendering, a graphics processing unit (GPU) generates 3D graphics from a single point of view (e.g., mono view). This single point of view may mean a single image that is viewable by both the right eye and left eye of a viewer.

S3D graphics differs from 3D graphics in that S3D graphics generate stereoscopic view. The term stereoscopic view refers to images that are generated from a binocular point of view. In a binocular point of view, there may be two images, where one image is viewable by one of the eyes and not the other, and vice-versa. For example, when a viewer wears binoculars, the light that enters through the left lens for the binoculars is viewable by the left eye, and not the right eye, and vice-versa. The binocular point of view may be referred to as stereoscopic view.

For example, in S3D graphics, the GPU may generate an image for the left-eye and another image for the right-eye, i.e., a stereoscopic view. The term stereoscopic view refers to two images (e.g., left-eye image and right-eye image) that are each displayed on the display, whereas mono view refers to a single image that is displayed on the display. The combination of the left-eye image and the right-eye image may appear to a viewer as if the image is popping out of or pushing into the display that is displaying the images. This may result in a more realistic and richer viewing experience.

In this disclosure, the concept of an S3D image (e.g., stereoscopic view) and a 3D image (e.g., mono view) should not be confused. A 3D image is an image that is constrained to a 2-dimensional (2D) area of a display. For instance, objects within a 3D image may appear further away or closer than other objects within the 3D image. However, all of these objects are limited to the 2D area of the display. An S3D image is a perceived image resulting from a brain of a viewer combining the right-eye and left-eye images. The resulting image (i.e., the S3D image) appears to not be constrained to the 2D area of the display. Rather, the S3D image appears to encompass a 3D volume, where the image appears to pop out of or push into the display. For instance, objects within the S3D image appear further away or closer than other objects within a 3D volume, and not a 2D area, as is the case with 3D images.

The right-eye and left-eye images, that together form the S3D image, may be 3D images. It is the brain of the viewer that causes the viewer to perceive the S3D image when the brain combines the 3D right-eye image and the 3D left-eye image. The content of the right-eye image and left-eye images may be substantially similar to the content of the single 3D image. The techniques described in this disclosure may modify instructions that cause the GPU to generate graphics content for a mono view to instructions that cause the GPU to generate graphics content for the stereoscopic view. In other words, prior to modification, the instructions may cause the GPU to generate a single 3D image. Subsequent to modification, the instructions may cause the GPU to generate two 3D images (e.g., the 3D left-eye image and the 3D right-eye image).

It should be noted that although the techniques described in this disclosure are generally disclosed for 3D images, aspects of this disclosure are not so limited. The techniques of this disclosure may be extended to 2D graphics as well. For example, the single image of the mono view may be a 2D image, and the techniques of this disclosure may modify instructions to cause the GPU generate two 2D images for the stereoscopic view. In this case, the viewer will perceive a single image that is popped out of or pushed into the display that is displaying the two images for the stereoscopic view. To avoid confusion, the techniques described below refer to a single image for the mono view, and left-eye and right-eye image for the stereoscopic view, with the understanding that these images could be 3D images or 2D images.

The example techniques described in this disclosure may modify instructions issued by an application that are to be performed by the GPU and instructions of a vertex shader program that is to be executed by the GPU. For example, an application processor may execute the application. The application may have been designed to generate a single image (e.g., a mono view), and may generate the graphics content of the single image as a plurality of primitives. In addition, the application may determine pixel values, such as color, transparency, and coordinate values, for each vertex of the primitives During execution of the application (e.g., in run-time), the application issues a command to retrieve instructions of the vertex shader program. The output of the vertex shader program, when executed, may be clipping coordinates for the vertices of primitives generated by the application for the single image (e.g., mono view). The example techniques may modify the instructions of the vertex shader program to generate clipping coordinates for the vertices of primitives for the left-eye image and the right-eye image (e.g., stereoscopic view).

Also, during execution of the application, the application issues a draw instruction to the GPU to instruct the GPU to draw one or more of the primitives within the single image. For instance, in the techniques of this disclosure, the application executing on the application processor outputs instructions as if the GPU is going to generate graphics content for a single image. The techniques described herein modify one or more of the instructions issued by the application, such as the draw instruction, to generate graphics content for the left-eye and right-eye images. In this way, there is no modification to the instructions from the perspective of the application.

For instance, the techniques described in this disclosure monitor the instructions issued by the application. When the application issues a draw instruction, the techniques capture such a draw instruction and issue two draw instructions, where one instruction is to generate graphic content for the left-eye image and one instruction is to generate graphics content for the right-eye image.

In addition, the techniques modify the viewport instruction issued by the application. For example, the application issues a viewport instruction that defines the viewport of the single image. The viewport defines the size and location of the image on the display. For example, the viewport may define the starting coordinates of the image, and the width and length of the image. The width and length of the image may be values that indicate a horizontal distance and a vertical distance encompassed by the image. The width and length need not necessarily be coordinate values; rather, the width and length define a distance starting from the starting coordinates of the image. The application may provide the definition of the viewport for the single image to the GPU.

The techniques of this disclosure modify the viewport instruction to generate viewport instructions for the left-eye image and the right-eye image that define the size and the location of each of the left-eye and right-eye images on the display. In this way, the modified viewport instruction may constrain the left-eye image to one portion of the display, and the right-eye image to the other portion of the display. In some examples, the modified viewport instruction may constrain the left-eye image to the left half of the display, and the right-eye image to the right half of the display. However, aspects of this disclosure are not so limited, and the modified viewport instruction may constrain the left-eye image to the top half of the display, and the right-eye image to the bottom half of the display, as another non-limiting example. In some instances, the example techniques may further modify the viewports for the right-eye image and the left-eye image to potentially provide a better viewing experience. For example, the techniques may shift or stretch the viewports for the right-eye image and the left-eye image.

The instructions that modify the viewport may not be part of the instructions that modify the shader program. For example, the GPU may include a shader processor, sometime referred to as a shader core, and one or more fixed-function units. The vertex shader program may execute on the shader processor, and the application of the viewport to constrain the image to the defined viewport may be performed by at least one of the fixed-function units (e.g., a viewport transformation unit of the fixed-function units). In the example techniques, the shader processor may execute the modified shader program to generate graphics content for the stereoscopic view, and the at least one fixed-function unit may apply the defined viewport for each of the left-eye and right-eye images to constrain these images to respective halves of the display. In other words, the viewport modification may occur external to the execution of the modified shader program.

FIG. 1 is a block diagram illustrating an example of a device that may implement one or more example techniques described in this disclosure. For instance, FIG. 1 illustrates a device 10. Examples of device 10 include, but are not limited to, mobile wireless telephones, personal digital assistants (PDAs), video gaming consoles that include video displays, mobile video conferencing units, laptop computers, desktop computers, television set-top boxes, digital media players, smartphones, and the like. As illustrated in FIG. 1, device 10 may include application processor 12, graphics processing unit (GPU) 20, and system memory 26. Device 10 may include components in addition to those illustrated in FIG. 1. These components are not illustrated in FIG. 1 for purposes of clarity, and are further illustrated in FIG. 3.

Application processor 12 may be the central processing unit (CPU) of device 10. GPU 20 may be a processing unit operable to output graphics data for presentation on a display. Examples of application processor 12 and GPU 20 include, but are not limited to, a digital signal processor (DSP), a general purpose microprocessor, application specific integrated circuit (ASIC), field programmable logic array (FPGA), or other equivalent integrated or discrete logic circuitry.

System memory 26 may be an example of a computer-readable storage medium. For example, system memory 26 may store instructions that cause application processor 12 and GPU 20 to perform functions ascribed to each in this disclosure. In this way, system memory 26 may be considered as a computer-readable storage medium comprising instructions that cause one or more processors, e.g., application processor 12 or GPU 20, to perform various functions.

Examples of system memory 26 include, but are not limited to, a random access memory (RAM), a read only memory (ROM), an electrically erasable programmable read-only memory (EEPROM), CD-ROM or other optical disk storage, magnetic disk storage, or other magnetic storage devices, flash memory, or any other medium that can be used to carry or store desired program code in the form of instructions or data structures and that can be accessed by a computer or a processor. System memory 26 may, in some examples, be considered as a non-transitory storage medium. The term "non-transitory" may indicate that the storage medium is not embodied in a carrier wave or a propagated signal. However, the term "non-transitory" should not be interpreted to mean that system memory 26 is non-movable. As one example, system memory 26 may be removed from device 10, and moved to another device. As another example, a storage device, substantially similar to system memory 26, may be inserted into device 10. In certain examples, a non-transitory storage medium may store data that can, over time, change (e.g., in RAM).

GPU 20 may include shader processor 22 and fixed-function pipeline 24. Shader processor 22, sometimes referred to as a shader core, may be a core of GPU 20 upon which shader programs such as vertex shaders and fragment shaders execute. Fixed-function pipeline 24 may include hardware units that perform fixed functions. In other words, the shader programs such as vertex shaders and fragment shaders may be software units that execute on shader processor 22 and allow for functional flexibility, whereas fixed-function pipeline 24 include hardware units with fixed functions and minimal functional flexibility.

The example techniques described in this disclosure may modify shader programs that are designed to generate a single three-dimensional (3D) image (e.g., for a mono view), such that when the modified shader programs are executed on shader processor 22, GPU 20 generates graphics data for S3D images (e.g., a stereoscopic view). Again, as discussed above, stereoscopic view includes a left-eye image and a right-eye image. The left-eye image and the right-eye image include substantially similar graphics content as the mono view image; however, one or more corresponding pixels of the left-eye and right-eye images may be displaced along the horizontal axis relative to one another. For example, imagine that the right-eye image is placed on top of the left-eye image. In this case, all of the content in the right-eye image may not line up perfectly with the identical content in the left-eye image. Rather, one or more objects in the right-eye may be to the left or to the right of the identical objects in the left-eye image.

The left-eye image is viewable by the left eye of the viewer, and the right-eye image is blocked from the left eye of the viewer. The right-eye image is viewable by the right eye of the viewer, and the left-eye image is blocked from the right eye of the viewer. In some examples, the viewer may wear specialized glasses that block the left-eye image from being viewable by the right eye, and the right-eye image from being viewable by the left eye. However, aspects of this disclosure do not necessarily require a viewer to wear specialized glasses. For example, some displays do not require the viewer to wear specialized glasses to experience stereoscopic view. Techniques of this disclosure may be extended to such displays.

GPU 20 may generate the graphics data for the left-eye image and the right-eye image such that when the viewer views both the left-eye image and the right-eye image at the same time the brain of the viewer causes the viewer to perceive an image that pops out of the display or pushes into the display displaying the two images (e.g., appears to be ahead of or behind the display). This popping out or pushing in is due to the brain of the viewer resolving the horizontal discrepancies in the two images of the stereoscopic view with substantially similar content.

As an example, application processor 12 may execute one or more applications, such as application 32, stored in system memory 26. Examples of application 32 include, but are not limited to, web browsers, user interfaces, e-mail applications, spreadsheet applications, word processing applications, graphics authoring applications, video games, or other applications that generate viewable objects for display. For instance, application 32 may be a video game that when executed outputs graphical content that is displayed on a display.

Application 32 may be designed by a developer for mono view. For example, application 32, upon execution, may generate 3D graphics content, where the 3D graphics content is constrained to the 2D area of the display. Application 32, upon execution on application processor 12, may divide the generated 3D graphics content into primitives such as triangles, rectangles, or other types of polygons. Each of these primitives may include pixels that are to be displayed on the display. Application 32, upon execution on application processor 12, may also assign pixel values to each of the vertices of the primitives. For example, the pixel values may include 3D coordinates of the vertices, color values of the vertices, and transparency values of the vertices. The pixel values need not include all of the above example components in every aspect of this disclosure.

Application processor 12 may then forward the pixel values for the vertices to GPU 20 for further processing. For example, application processor 12 may include graphics driver 14, which may be software executing on application processor 12. Graphics driver 14 may be designed to transmit commands to GPU 20, and in response, GPU 20 may perform functions in accordance with the received commands. For example, graphics driver 14 functions as an interface between GPU 20 and application processor 12. When application processor 12 issues a command to GPU 20, it is through graphics driver 14 that GPU 20 receives the command. For instance, application 32, executing on application processor 12, may instruct GPU 20 to perform a particular task. In this case, graphics driver 14 may receive the instruction from application 32 for the particular task, and may provide the instruction to GPU 20. In response, GPU 20 may perform the task.

In some examples, graphics driver 14 may be designed in accordance with a specific application programming interface (API). For example, graphics driver 14 may be designed according to the OpenGL or OpenGL ES (embedded system) APIs, which are APIs of the Khronos Group and their specifications are available publicly. However, the techniques of this disclosure may be extendable to the Microsoft DirectX system, such as DirectX 9, 10, or 11, or any other shader-based graphics system and APIs. For purposes of illustration, the techniques of this disclosure are described in the context where the API is the OpenGL ES 2.0 API. However, aspects of this disclosure are not so limited, and can be extended to other APIs or shader-based graphics systems.

To render the primitives received from application processor 12, shader processor 22 of GPU 20 may execute one or more shader programs such as vertex shaders and fragment shaders to generate the pixel values for the pixels of a display. A developer may develop these vertex shaders and fragment shaders in accordance with an API, such as the OpenGL ES 2.0 API used in this disclosure for illustration purposes. The source code for these vertex and fragment shaders may be stored in system memory 26.

For example, application 32 may utilize vertex shader 28, which may be designed to generate a mono view. For instance, the pixel values generated by application 32 may need to be processed by shader processor 22 using vertex shader 28. As one example, vertex shader 28 may be a vertex shader particularly called by application 32 during the execution of application 32 on application processor 12. Vertex shader 28 may execute on shader processor 22 of GPU 20, and application 32 may execute on application processor 12, but vertex shader 28 and application 32 may be interrelated for the purposes of displaying the images generated by application 32.

The source code of vertex shader 28 may be stored in system memory 26. Graphics driver 14 may retrieve the source code of vertex shader 28 and provide the source code for vertex shader 28 to compiler 18. Compiler 18 may compile the source code of vertex shader 28 to generate object code of vertex shader 28, and store the object code in system memory 28. Graphics driver 14 may then instruct GPU 20 to retrieve the object code of vertex shader 28 from system memory 26, and instruct GPU 20 to execute the object code of vertex shader 28 on shader processor 22. Shader processor 22 may then execute the object code of vertex shader 28 to process the pixel values for the vertices generated by the execution of application 32. GPU 20, in conjunction with fixed-function pipeline 24 and shader processor 22, may generate the graphics content for application 32 for display.

Although system memory 26 is shown to store source code for only one vertex shader 28, aspects of this disclosure are not so limited. For example, application 32 may possibly utilize multiple different vertex shaders, and the source code for each of these vertex shaders may be stored in system memory 26. Also, application 32 may require execution of multiple instantiations of vertex shader 28. For example, shader processor 22 may execute multiple instantiations of vertex shader 28 at the same time (e.g., in parallel), where each instantiation of vertex shader 28 performs substantially similar functions, but on different pixel values. System memory 26 may similarly store source code for fragment shaders. Graphics driver 14 may retrieve the source code for the fragment shaders, and compiler 18 may compile the source code to generate object code for the fragment shaders in a manner similar to that described above for vertex shader 28.

As will be described in further detail, one or more example techniques of this disclosure may modify the source code of vertex shader 28 prior to the compilation. Compiler 18 may compile the modified source code to generate object code of modified vertex shader 30. Shader processor 22 may execute the object code of modified vertex shader 30, which may cause GPU 20 to generate stereoscopic 3D graphics content (e.g., the graphics content for the left-eye image and the right-eye image of S3D). However, prior to describing the modification to the source code of vertex shader 28, the following describes example functionality of vertex shader 28, which may assist in the understanding of the modification applied to the source code of vertex shader 28.

As described above, application 32 may generate coordinates for the vertices of the primitives. These coordinates may be referred to as world coordinates, and may be specific to application 32. In other words, the coordinates of the vertices, as defined by application 32, may not necessarily be coordinates of the display upon which the primitives are displayed and may also possibly be coordinates for vertices that are outside of a viewable area. Vertex shader 28 may be designed to convert the world coordinates, which may be in 3D, into 2D coordinates of the display (e.g., display coordinates). To perform this function, vertex shader 28 may transform the world coordinates into eye coordinates, and then to clipping coordinates. For example, the output of vertex shader 28, when executed, may be the clipping coordinates of the vertices. The final display coordinates, e.g., the coordinates of the display, may be determined subsequently as part of the fixed-function pipeline 24.

The clipping coordinates may define a view frustum. The view frustum may define the viewable area of the 3D graphics content. GPU 20 may utilize the view frustum to cull pixels which reside external to the view frustum. For example, a fixed-function unit of fixed-function pipeline 24 (e.g., a frustum unit of fixed-function pipeline 24) may cull pixels which reside external to the view frustum, as defined by the clipping coordinates generated by vertex shader 28.

The equation to calculate the clipping coordinates from the world coordinates may be:

$$V_{clip} = PRJ * V_{eye} = PRJ * MVT * V_{world}, \quad \text{(equation 1)}$$

where Vclip is the vertex clip coordinates, Veye is the vertex eye coordinates, Vworld is the vertex world coordinates provided by application 32, PRJ is a projection matrix, and MVT is a model view transformation matrix (or world view transformation matrix). In some examples, the PRJ and MVT matrices may be combined into a single matrix. However, for ease of understanding, these matrices are described separately.

The projection matrix (PRJ) and model view, or world view, transformation matrix (MVT) may be defined by the API. The terms model view and world view may be used interchangeably. Vclip, Veye, and Vworld may include four components (e.g., x, y, z, and w coordinates). For example, Vclip, Veye, and Vworld may be represented as:

$$V_{clip} = \begin{bmatrix} x_{clip} \\ y_{clip} \\ z_{clip} \\ w_{clip} \end{bmatrix}, V_{eye} = \begin{bmatrix} x_{eye} \\ y_{eye} \\ z_{eye} \\ w_{eye} \end{bmatrix}, V_{world} = \begin{bmatrix} x_{world} \\ y_{world} \\ z_{world} \\ w_{world} \end{bmatrix} \quad \text{(equation 2)}$$

The OpenGL, OpenGL ES, and OpenGL ES 2.0 APIs, with programmable shaders, define the PRJ matrix as:

$$PRJ = \begin{bmatrix} \frac{2z_{near}}{(R-L)} & 0 & \frac{R+L}{R-L} & 0 \\ 0 & \frac{2z_{near}}{T-B} & \frac{T+B}{T-B} & 0 \\ 0 & 0 & -\frac{z_{near}+z_{far}}{z_{far}-z_{near}} & -\frac{2z_{near}z_{far}}{z_{far}-z_{near}} \\ 0 & 0 & -1 & 0 \end{bmatrix}, \quad \text{(equation 3)}$$

where L and R specify the coordinates for the left and right vertical clipping planes, respectively, B and T specify the coordinates for the bottom and top horizontal clipping planes, respectively, and $z_{near}$ and $z_{far}$ specify the distances to the near and the far depth clipping planes, respectively.

In some examples, the clipping planes may be symmetrical. For example, −L may be equal to R, and −B may be equal to T. In these instances, the PRJ matrix may simplify to:

$$PRJ = \begin{bmatrix} \frac{2z_{near}}{(R-L)} & 0 & 0 & 0 \\ 0 & \frac{2z_{near}}{T-B} & 0 & 0 \\ 0 & 0 & -\frac{z_{near}+z_{far}}{z_{far}-z_{near}} & -\frac{2z_{near}z_{far}}{z_{far}-z_{near}} \\ 0 & 0 & -1 & 0 \end{bmatrix} \quad \text{(equation 4)}$$

The OpenGL, OpenGL ES, and OpenGL ES 2.0 APIs, with programmable shaders, define the MVT matrix as:

$$MVT = \begin{bmatrix} a_{11} & a_{12} & a_{13} & a_{14} \\ a_{21} & a_{22} & a_{23} & a_{24} \\ a_{31} & a_{32} & a_{33} & a_{34} \\ 0 & 0 & 0 & 1 \end{bmatrix} \quad \text{(equation 5)}$$

All of the variables of the PRJ and MVT matrices may be defined by application 32 executing on application processor 12, and graphics driver 14 may provide these variables to shader processor 22 that is executing the object code of vertex shader 28. As can be seen from equations 1, 4, and 5, with these variables, vertex shader 28 may determine the Vclip coordinates for each of the vertices. GPU 20 may utilize the clip coordinates for the vertices and perform further functionality, in conjunction with the functionality of fixed-function pipeline 26 and fragment shaders, to render an image for display. In this way, GPU 20 may generate a mono view for the graphics content generated by application 32.

In accordance with techniques of this disclosure, while vertex shader 28 may utilize the variables for the MVT and PRJ matrices to determine the Vclip coordinates, the MVT and PRJ matrices may not be needed to modify the source code of vertex shader 28 to generate the stereoscopic view. Rather, the techniques of this disclosure may include instructions in vertex shader 28 that modify the clipping coordinates (Vclip), which are generated for a mono view, to generate clipping coordinates for the stereoscopic view (e.g., the left-eye image and the right-eye image).

The example above describes one way in which to determine the Vclip coordinates for the mono view. There may be many different techniques to calculate the clipping coordinates, and in general, it may be immaterial the particular technique utilized to calculate the clipping coordinates. However, in any event, for 3D graphics content, clipping coordinates (Vclip) may need to be calculated regardless of the technique used to calculate the clipping coordinates. For example, it may even be possible for application processor 12 to determine the clipping coordinates, and graphics driver 14 may provide the clipping coordinates to shader processor 22 that is executing the object code of vertex shader 28. In this example, the PRJ and MVT matrices may be unity matrices. For example, application processor 12 may perform the matrix multiplication of equation 1 and provide the results to shader processor 22. In this example, shader processor 22 may multiply received values with a unity matrix to generate the Vclip coordinates for each of the vertices generated by application 32.

However, in any case (e.g., where vertex shader 28 determines the clipping coordinates or where vertex shader 28 receives the clipping coordinates), vertex shader 28 may utilize a specific variable to store the clipping coordinates. The specific variable may be particular to the API for which vertex shader 28 is designed. For example, if vertex shader 28 is designed in accordance with the OpenGL, OpenGL ES, or OpenGL ES 2.0 APIs, with programmable shaders, vertex shader 28 may store the clipping coordinates in the gl_Position variable. There may be a similar variable in other graphics APIs. For instance, if vertex shader 28 is designed in accordance with the OpenGL, OpenGL ES, or OpenGL ES 2.0 APIs, with programmable shaders, vertex shader 28 may include instructions such as: gl_Position.x=$x_{clip}$, gl_Position.y=$y_{clip}$, gl_Position.z=$z_{clip}$, and gl_Position.w=$w_{clip}$, where, as indicated above in equation 2, $$V_{clip} = \begin{bmatrix} x_{clip} \\ y_{clip} \\ z_{clip} \\ w_{clip} \end{bmatrix}.$$

In one or more example techniques described in this disclosure, graphics driver wrapper 16, which may be software executing on application processor 12, may modify the instructions of vertex shader 28 that define the clipping coordinates for the mono view to define clipping coordinates for the stereoscopic view (e.g., clipping coordinates for the left-eye image and clipping coordinates for the right-eye image). Also, graphics driver wrapper 16, in addition to modifying instructions of vertex shader 28 that define the clipping coordinates, may modify instructions that define the viewport for the mono view to define viewports for the stereoscopic view.

The term "viewport" refers to the area an image encompasses on the display. For example, application 32 may define the size and location of the single image (e.g., mono view) on the display that displays the image. This definition of the size and location of the single image may be considered as the viewport for the single image. To define the viewport, application 32 may issue a glViewport command whose variables define the size and location of the mono view image on the display. Graphics driver wrapper 16 may modify the command that defines the size and location of the single image, e.g., the glViewport command issued by application 32, to commands that define the size and location of the left-eye image and the right-eye image (e.g., glViewport commands that define the viewport for the left-eye image and the viewport for the right-eye image). The glViewport command for the left-eye image may constrain the left-eye image to one portion of the display, and the glViewport command for the right-eye image may constrain the right-eye image to another portion of the display.

In the examples of this disclosure, graphics driver wrapper 16 may modify the instructions that define the viewport external to the instructions that modify the instructions of vertex shader 28. In other words, graphics driver wrapper 16 may not need to modify the instructions of vertex shader 28 to modify the viewport for the left-eye image and the right-eye image of the stereoscopic view. Rather, graphics driver wrapper 16 may modify the instruction that defines the viewport such that a fixed-function unit (e.g., a viewport transformation unit) of fixed-function pipeline 24 applies the viewport for the left-eye image that constrains the left-eye image to one portion of the display, and applies the viewport for the right-eye image that constrains the right-eye image to another portion of the display upon which the left-eye and right-eye images are displayed.

In some examples, the viewport transformation unit of fixed-function pipeline 24 may constrain the left-eye image to the left half of the display, and the right-eye image to the right half of the display; however, aspects of this disclosure are not so limited. The viewport transformation unit may constrain the left-eye image and the right-eye image to portions other than the left half and right half of the display. In general, the viewport transformation unit may constrain the left-eye image and the right-eye image to portions of the display based on the modified viewport instruction that the viewport transformation unit receives, as described in more detail.

As one example, to cause GPU 20 to render an image, application 32 may execute a glShaderSource command. The glShaderSource command instructs graphics driver 14 to retrieve the source code of vertex shader 28 from system memory 26. In examples of this disclosure, in response to the glShaderSource command issued by application 32, graphics driver wrapper 16 may intercept the source code of vertex shader 28 before it reaches graphics driver 14. Graphics driver wrapper 16 may modify the source code of vertex shader 28 to include instructions that cause modified vertex shader 28, when executed, to generate graphics content for stereoscopic view. For example, graphics driver wrapper 16 may cause the modified vertex shader 28 to execute twice. In the first execution, the modified vertex shader 28 may generate graphics content for the left-eye image, and in the second execution, the modified shader 28 may generate graphics content for the right-eye image, or vice-versa.

Graphics driver wrapper 16, as executed by application processor 12, may function as a source code editor. As one example, graphics driver wrapper 16 may monitor the instructions issued by application 32. When graphics driver wrapper 16 recognizes that application 32 issued the glShaderSource command, graphics driver wrapper 16 may capture and modify the instructions of vertex shader 28 (e.g., the source code of vertex shader 28). For example, graphics driver wrapper 16 may include instructions into the instructions of vertex shader 28 that modify the value of the clipping coordinates generated for the single image (e.g., mono view) to generate the clipping coordinates for the left-eye image and the right-eye image (e.g., stereoscopic view).

For example, as indicated above, vertex shader 28 may include a gl_Position.x command that stores the value for the $x_{clip}$ coordinate. As discussed in greater detail below, graphics driver wrapper 16 may include an instruction into vertex shader 28 that updates the value of gl_Position.x (e.g., the $x_{clip}$ coordinate). To generate the left-eye image, the instruction added into vertex shader 28 by graphics driver wrapper 16 causes vertex shader 28 to add a constant to the $x_{clip}$ value. To generate the right-eye image, the instruction added into vertex shader 28 by graphics driver wrapper 16 causes vertex shader 28 to subtract a constant from the $x_{clip}$ value.

For example, graphics driver wrapper 16 may modify the source code of vertex shader 28 to add an instruction that changes the value stored in the gl_Position.x variable (e.g., the $x_{clip}$ coordinate) to the current value of the gl_Position.x variable plus $(z_{near}*w_{world}/(R-L)/2)*X$, where $z_{near}$, R, and L are all variables from the PRJ matrix (equation 4), and $w_{world}$ is a variable from the $V_{world}$ matrix (equation 2) (e.g., the vertex coordinates as defined by application 32). The value of X may be +D or −D, where D is an approximation of half the distance between the right eye and the left eye of the viewer, and may be user definable or a preprogrammed value.

As one example, graphics driver wrapper 16 may add the following instruction to the set of instructions of vertex shader 28: gl_Position.x+=$(z_{near}*w_{world}/(R-L)/2)*X$. This may be equivalent to gl_Position.x=gl_Position.x+$(z_{near}*w_{world}/(R-L)/2)*X$. For example, the gl_Position.x+=commands adds the value defined by the gl_Position.x+=instruction to the value stored by the gl_Position command (e.g., adds the value to $x_{clip}$). In some situations, the gl_Position.x+=instruction may simplify to gl_Position.x+=X. The reasons why the gl_Position.x+variable may equal $(z_{near}*w_{world}/(R-L)/2)*X$ or just X are described in further detail below.

In accordance with the techniques of this disclosure, to generate the left-eye image, the graphics driver wrapper 16 may define the value of the variable X to be +D. When X equals +D, the gl_Position.x+=command causes the addition of a constant (e.g. $(z_{near}*w_{world}/(R-L)/2)*D$ or just D) to the $x_{clip}$ coordinate of each of the vertices generated by application 32 which causes the vertices to move to the left by a value of D. To generate the right-eye image, the graphics driver wrapper 16 may define the value of the variable X to be −D. When X equals −D, the gl_Position.x+=command causes the subtraction of a constant (e.g., $(z_{near}*w_{world}/(R-L)/2)*-D$ or just −D) from the $x_{clip}$ coordinate of each of the vertices generated by application 32 which causes the vertices to move to the right by a value of −D.

After modifying the source code of vertex shader 28, graphics driver wrapper 16 may store the modified source code of vertex shader 28 in system memory. In some examples, graphics driver wrapper 16 may store the modified source of vertex shader 28 in the same location where the unmodified source code of vertex shader 28 is stored in system memory 26. In alternate examples, graphics driver wrapper 16 may store the modified source of vertex shader 28 in a location in system memory 26 that is different from the location where the unmodified source code of vertex shader 28 is stored.

Subsequent to issuing the glShaderSource command, application 32 issues a glCompileShader command. The glCompileShader command causes compiler 18, executing on application processor 12, to compile the modified source code of vertex shader 28. For example, the glCompileShader command may cause compiler 18 to retrieve the source code for the modified vertex shader 28 from system memory 26, and compile the modified vertex shader 28. After compiling, compiler 18 stores the resulting object code in system memory 26. For example, as illustrated, system memory 26 includes modified vertex shader 30. Modified vertex shader 30 is the object code resulting from compiler 18 compiling the modified source code of vertex shader 28.

Moreover, as described above, graphics driver wrapper 16 may include instructions in the source code of vertex shader 28 that cause vertex shader 28 to add a constant to the gl_Position.x variable to generate the left-eye image and subtract the constant from the gl_Position.x variable to generate the right-eye image. The object code of modified vertex shader 30 includes instructions that cause modified vertex shader 30 to add the constant to the gl_Position.x variable to generate the left-eye image and subtract the constant from the gl_Position.x variable to generate the right-eye image. As described in more detail, modified vertex shader 30 receives the value of the constant from graphics driver wrapper 16 in response to a draw command.

Application 32, upon execution by processor 12, may also issue a command that defines the viewport of the single image (e.g., a command that defines the size and location of the single image on the display). This command may be the glViewport command. The glViewport command defines the starting coordinates for the image (e.g., x and y coordinates) and the width and length of the image. The starting coordinates and the width and length values of the glViewport command define the size and location of the image.

In examples of this disclosure, graphics driver wrapper 16 may capture the glViewport command issued by application 32. In some examples, graphics driver wrapper 16 may block graphics driver 14 from transmitting the glViewport command issued by application 32 to GPU 20. Instead, graphics driver wrapper 16 may store the starting coordinates and the width and length values of the glViewport command, as issued by application 32, in system memory 26.

In an alternate example, graphics driver wrapper 16 may allow graphics driver 14 to transmit the glViewport command issued by application 32 to GPU 20. In this example, similar to above, graphics driver wrapper 16 may store the starting coordinates and the width and length values of the glViewport command, as issued by application 32. In this alternate example, prior to GPU 20 applying the glViewport command issued by application 32, graphics driver wrapper 16 may modify the glViewport command issued by application 32, and transmit the modified glViewport command to GPU 20. In this manner, although GPU 20 received the glViewport command issued by application 32, GPU 20 may execute the modified glViewport command, which is modified by graphics driver wrapper 16.

In either example, graphics driver wrapper 16 may then wait until application 32 issues a command to GPU 20 instructing GPU 20 to draw one or more primitives. This draw command may be a glDraw command. There are various examples of glDraw commands such as glDrawArrays and glDrawElements. Each of these various examples of draw commands is commonly referred to as a glDraw command.

When application 32 issues the glDraw command, graphics driver wrapper 16 captures the glDraw command, and blocks graphics driver 14 from transmitting the glDraw command to GPU 20. Graphics driver wrapper 16 then generates instructions that cause GPU 20 to generate the graphics content for the left-eye image and the right-eye image. As one example, graphic driver wrapper 16 generates instructions that cause GPU 20 to execute the object code of modified vertex shader 30 twice, issues two glViewport commands to define the viewport for the left-eye image and the right-eye image, and issues two glDraw commands.

As an overview of the techniques, after graphics driver wrapper 16 blocks graphics driver 14 from the transmitting the glDraw command issued by application 32, graphics driver wrapper 16 issues a command to GPU 20 that causes shader processor 22 to make the modified vertex shader 20 ready to generate clipping coordinates for a first image of the stereoscopic view (e.g., the left-eye image). Then, graphics driver wrapper 16 may issue a first glViewport command to a viewport transformation unit of the fixed-function pipeline 24 which defines the size and location of the first image on the display. Graphics driver wrapper 16 may then issue a first glDraw command to GPU 20 that causes GPU 20 to render the first image constrained to a first portion of the display as defined by the first glViewport command.

Graphics driver wrapper 16 then issues a command to GPU 20 that causes shader processor 22 to make the modified vertex shader 30 ready to generate clipping coordinates for a second image of the stereoscopic view (e.g., the right-eye image). Then, graphics driver wrapper 16 may issue a second glViewport command to a viewport to the viewport transformation unit of the fixed-function pipeline 24 which defines the size and location of the second image on the display. Graphics driver wrapper 16 may then issue a second glDraw command to GPU 20 that causes GPU 20 to render the second image constrained to a second portion of the display as defined by the second glViewport command.

The techniques of this disclosure, described as an overview above, are described in more detail in the following examples. For ease of understanding only, in the following examples, the techniques are described with GPU 20 generating the graphics content for the left-eye image first, followed by the graphics content for the right-eye image; however, the opposite is also possible. Also, for ease of understanding only, the techniques are described where the viewport for the left-eye image is constrained to the left half of the display, and the viewport for the right-eye image is constrained to the right half of the display, although this should not be considered as limiting.

For example, after graphics driver wrapper 16 intercepts the glViewport command and then blocks the glDraw command issued by application 32, graphics driver wrapper 16 generates an instruction that instructs GPU 20 to generate clipping coordinates for the left-eye image. Again, it should be noted that in some examples graphics driver wrapper 16 may block the transmission of the glViewport command issued by application 32 to GPU 20. In other examples, graphics driver wrapper 16 may allow the glViewport command issued by application 32 to be transmitted to GPU 20. However, in either of the examples, graphics driver wrapper 16 may transmit modified glViewport commands to GPU 20. In this manner, even if GPU 20 received the glViewport command issued by application 32, GPU 20 may not execute the glViewport command issued by application 32, and may instead execute the modified glViewport commands issued by graphics driver wrapper 16. In other words, the modified glViewport commands, modified by graphics driver wrapper 16, reset the glViewport command issued by application 32.

As one example, graphics driver wrapper 16 generates an instruction that causes GPU 20 to execute the object code of modified vertex shader 30. In response, shader processor 22 of GPU 20 executes the object code of modified vertex shader 30. In addition, graphics driver wrapper 16 transmits the constant value that modified vertex shader 30 is to add to the gl_Position.x variable to generate the clipping coordinates for the left-eye image. The output of shader processor 22, due to the execution of the object code of modified vertex shader 30, is the clipping coordinates for the vertices of the left-eye image.

For instance, as discussed above, graphics driver wrapper 16 may include the following instruction into the source code of vertex shader 28: gl_Position.x+=($z_{near}$*$w_{world}$/(R−L)/2)*X, or just gl_Position.x+=X, for reasons that will be described. The $z_{near}$, $w_{world}$, R, and L variables may possibly be known to shader processor 22, as described above with respect to equations (2) and (4). However aspects of this disclosure do not require shader processor 22 to know the values of the $z_{near}$, $w_{world}$, R, and L variables. For example, the $z_{near}$, world, R, and L variables may each be constants, and therefore the result of ($z_{near}$*$w_{world}$/(R−L)/2) would be a constant value. In this case, the value of ($z_{near}$*$w_{world}$/(R−L)/2) could be estimated or user provided, and multiplied into the value of X. As described in more detail, in some examples, ($z_{near}$*$w_{world}$/(R−L)/2) may simplify to 1.

In some examples, shader processor 22 may not know the value of X. For the left-eye image, graphics driver wrapper 16 may transmit the value of X to shader processor 22 in addition to the instruction instructing shader processor 22 to execute the object code of modified vertex shader 30. In some examples, the value of X, for the left-eye image, may be +D where D equals approximately half the distance between the eyes of the viewer, and may be user defined or preprogrammed. Because the value of variable X is +D, the gl_Position.x+=command causes shader processor 22 to add the value of D to the value stored in the gl_Position.x variable (e.g., add D to the value of $x_{clip}$).

Graphics driver wrapper 16 also defines the viewport for the left-eye image. For example, prior to when application 32 issued the glDraw command, application 32 issued the glViewport command that graphics driver wrapper 16 intercepted. Graphics driver wrapper 16 also stored the starting coordinates and the width and length values in system memory 32. To define the viewport for the left-eye image, graphics driver wrapper 16 may modify the intercepted glViewport command issued by application 32.

For example, the glViewport command includes four variables, where the first two variables define the starting coordinate for the image on the display, and the last two variables define the width and length of the image. The width and length variables are not necessarily coordinate values. Rather, the width and length variables define the amount by which the image extends from the starting coordinates. For instance, application 32 may issue a glViewport command that states: glViewport (0, 0, width, length). In this example, the (0, 0) refer to the bottom-left of the display. The variable "width" refers to the width of the display, and the variable "length" refers to the length of the display. Accordingly, in this example, application 32 defines the viewport of the image to encompass the entirety of the display, which would be consistent with a mono view image. However, application 32 may assign different variables for the glViewport command, other than those illustrated.

In accordance with this disclosure, graphics driver wrapper 16 may intercept the glViewport command (e.g., glViewport (0, 0, width, length) of the previous example), and modify the variables for this viewport command. For example, graphics driver wrapper 16 may modify the variables of the glViewport command to constrain the left-eye image to a desired portion of the display. For ease of description, the techniques describe constraining the left-eye image to the left half of the display, and right-eye image to the right half of the display; however, aspects are not so limited.

For the left-eye image, graphics driver wrapper 16 may modify glViewport command issued by application 32 to glViewport (0, 0, width/2, length). In this example, the width/2 would be half of the width of the display. For example, the modified glViewport command indicates that the left-eye image with start from the left end of the display (e.g., starting from 0 point on the x-axis) and extend rightwards a distance of "width/2," which would constrain the left-eye image to the left half of the display. Also, the modified glViewport command indicates that the left-eye image will start from the bottom of the display (e.g., starting from the 0 point on the y-axis) and extend upwards a distance of "length," which would constrain the image to the top and bottom of the display.

Graphics driver wrapper 16 may then issue a first glDraw command to GPU 20. In response to the glDraw command, GPU 20 may process the clipping coordinates for the left-eye image generated by the execution of the object code of the modified vertex shader 30 through fixed-function pipeline 24 and fragment shaders. In this example, the first glViewport command may constrain the left-eye image to the left half of the display. The glDraw command may then cause GPU 20 to render the left-eye image to a frame buffer for temporary storage. For example, the frame buffer may store the left-eye image until the right-eye image is generated. Then, GPU 20 may output the entirety of the frame buffer to a display processor (not shown). The display processor may cause the display to display the left-eye image and the right-eye image to generate the stereoscopic view.

Graphics driver wrapper 16 may repeat the same steps for generating the left-eye image, but for generating the right-eye image. For example, graphics driver wrapper 16 issues another instruction to cause shader processor 22 to execute the object code of modified vertex shader 30. In addition, graphics driver wrapper 16 transmits the constant value that modified vertex shader 30 is to subtract from the gl_Position.x variable to generate the clipping coordinates for the right-eye image. The output of shader processor 22, due to the execution of the object code of modified vertex shader 30, is the clipping coordinates for the vertices of the right-eye image.

As described above, graphics driver wrapper 16 may add the instruction gl_Position.x+=$(z_{near}*w_{world}/(R-L)/2)*X$, or just gl_Position.x+=X to the source code of vertex shader 28. For the left-eye image, the value of variable X may be +D (e.g., half the distance between the eyes of the viewer).

In examples of this disclosure, for the right-eye image, the value of variable X may be −D. Because the value of variable X is −D, the gl_Position.x+=command causes shader processor 22 to subtract the value of D from the value stored in the gl_Position.x variable (e.g., subtract −D from the value of $x_{clip}$).

Graphics driver wrapper 16 also defines the viewport for the right-eye image. As discussed above, for the left-eye image, graphics driver wrapper 16 defines the viewport to be glViewport (0, 0, width/2, length) to constrain the left-eye image to the left half of the display. For the right-eye image, graphics driver wrapper 16 may define the viewport to be glViewport (width/2, 0, width/2, length). In this example, the (width/2, 0) coordinate indicates that the right-eye image will start from the middle of the display and extend rightwards. Also, the (width/2, length) variables in the glViewport command indicate that the right-eye image will extend half the width of the display and the full length of the display.

Therefore, in this example, the modified glViewport command (e.g., glViewport (width/2, 0, width/2, length)) would constrain the right-eye image to the right half of the display. For example, the modified glViewport command indicates that the right-eye image will start from the middle of the display (e.g., starting from the width/2 point on the x-axis) and extend rightward a distance of "width/2," which would constrain the right-eye image to the right half of the display. Also, the modified glViewport command indicates that the right-eye image will start from the bottom of the display (e.g., starting from the 0 point on the y-axis) and extend upward a distance of "length," which would constrain the image to the top and bottom of the display.

Graphics driver wrapper 16 may then issue a second glDraw command to GPU 20. In response to the glDraw command, GPU 20 may process the clipping coordinates for the right-eye image generated by the execution of the object code of the modified vertex shader 30 through fixed-function pipeline 24 and fragment shaders. In this example, the second glViewport command may constrain the right-eye image to the right half of the display. The glDraw command may then cause GPU 20 to render the right-eye image to the frame buffer for temporary storage. In this case, GPU 20 may have already stored the left-eye image to the frame buffer, and GPU 20 may instruct the display processor to retrieve and display the stored left-eye image and right-eye image from the frame buffer to generate the stereoscopic view.

As described above, graphics driver wrapper 16 may add the instruction gl_Position.x+=command to the source code of vertex shader 28. It is the gl_Position.x+=command that is added to the source code of vertex shader 28 that causes the slight displacement between the left-eye image and the right-eye image to cause the popping out or pushing effect of the stereoscopic view. It is the modification of the instruction that defines the viewport for the mono view (e.g., glViewport) to instructions that define the viewport for the right-eye and left-eye images that constrain the left-eye image and the right-eye image to appropriate portions of the display (e.g., the left half and right half of the display, respectively).

To further assist with understanding, assume that graphics driver wrapper 16 did not modify the instructions of vertex shader 28 to include the gl_Position.x+=command, but graphics driver wrapper 16 modified the glViewport command, and caused GPU 20 to execute two glViewport commands and two glDraw commands. In this case, GPU 20 would render two images because of the two glDraw commands. However, in this example to assist with understanding, if these two images were placed on top of one another, there would be no displacement, and the content of the two images would line up perfectly. Because there is no displacement in the content of the two images, there may not be any stereoscopic effect, and the image would appear to the viewer as a single image constrained to the 2D area of the display. The inclusion of the gl_Position.x+=command may cause the displacement in the content of the two images. Then, when the viewer simultaneously views the left-eye and right-eye images, where the left-eye image is blocked from the right eye, and the right-eye image is blocked from the left eye, the brain of the viewer resolves the displacement in the content of the two images to create the popping out or pushing in affect of the stereoscopic view.

Furthermore, in some examples, graphics driver wrapper 16 may further modify the viewport, in addition to the modification described above. For example, as described above, graphics driver wrapper 16 may modify the glViewport instruction for the left-eye image to glViewport (0, 0, width/2, length), and modify the glViewport instruction for the right-eye image to glViewport (width/2, 0, width/2, length). When the viewer views these two images (e.g., the stereoscopic view), the viewer may perceive the stereoscopic image that encompasses a 3D volume on a zero disparity plane (ZDP).

The ZDP may appear popped out of or pushed into the display (e.g., appear ahead of or behind the display). However, the location of the ZDP may not necessarily be at the desired location. For example, the viewer may experience a richer and more realistic viewing experience if the ZDP were popped out further, not popped out as much, not pushed in as much, or pushed in further.

To change the ZDP, which may be referred to as viewport shift or shifting of the ZDP, graphics wrapper driver 16 may shift the left boundary for the left-eye image and the right-eye image. For example, for the left-eye image, graphics wrapper 16 may modify the glViewport command to (0−Vps, 0, width/2, length), and for the right-eye image, graphics wrapper 16 may modify the glViewport command to ((width/2+Vps), 0, width/2, length) to change the amount by which the stereoscopic view is popped out of the display.

In these examples, the Vps value refers to viewport shift and indicates the amount by which the viewport of the left-eye image shifts and the amount by which the viewport of the right-eye image shifts. The Vps value may be user selectable or preprogrammed. For example, if the viewer desires to shift the ZDP from its current location (e.g., prior the viewport shift), the viewer may select the Vps value that achieves the desired location of the ZDP. Alternatively, the Vps value may be preprogrammed based on tests that provide a measure of where viewers considered the ZDP to be optimally located. For instance, if Vps is a positive value, the amount by which the stereoscopic view is popped out may be reduced (e.g., the ZDP plane is closer to the display). If Vps is a negative value, the amount by which the stereoscopic view is popped out may be increased (e.g., the ZDP plane is further from the display).

In some examples, in addition to a viewport shift, graphics driver wrapper 16 may modify the glViewport commands for the left-eye and right-eye images for viewport stretch. Viewport stretch may be considered as stretching the size of viewport, which may result in the stretching of the left-eye image and the right-eye image. In some instances, the viewport shift and the viewport stretch may result in a better stereoscopic view. The viewport shift and the viewport stretch may be referred commonly as modifying the viewport. In other words, graphics driver wrapper 16 may modify the glViewport command issued by application 32 to generate glViewport commands for the left-eye image and the right-eye image that define the viewports for the left-eye image and the right-eye image, respectively. In this example, graphics driver wrapper 16 may further modify the viewports of the left-eye image and the right-eye image (e.g., viewport shift or viewport shift and viewport stretch).

For stretching the viewport for the left-eye image, graphics driver wrapper 16 may modify the glViewport command for the left-eye image to be glViewport (0−Vps, 0, width/2+Vps, length). For stretching the viewport for the right-eye image, graphics driver wrapper 16 may modify the glViewport command for the right-eye image to be glViewport (width/2, 0, width/2+Vps, length). In the example techniques, the viewport shift and the viewport stretch may be not necessary in every instance. For instance, in some examples, graphics driver wrapper 16 may modify the glViewport command issued by application 32 to glViewport commands for the left-eye image and the right-eye image, and may not perform any additional viewport shifting or stretching. In some alternate examples, graphics driver wrapper 16 may modify the glViewport command issued by application 32, and further modify the viewports of the left-eye image and right-eye image (e.g., viewport shift or viewport shift and viewport stretch).

In some examples, the viewport shift and viewport stretch may be performed at the same time as the modification of the glViewport command. For example, as described above, graphics driver wrapper 16 may modify the glViewport command for the left-eye image to glViewport (0, 0, width/2, length), and for the right-eye image to glViewport (width/2, 0, width/2, length). In some examples, where the user desires to input the viewport shift value (e.g., Vps), graphics driver wrapper 16 may shift or shift and stretch the viewport, as described above. In alternate examples, graphics driver wrapper 16 may proactively add or subtract the Vps values, when modifying the glViewport command, in examples where the Vps value is preprogrammed.

As an example, assume the size of the display is 10×10 pixels, and the Vps value is selected or preprogrammed to be 2 to reduce the amount by which the stereoscopic view is popped out. In this example, prior to the viewport shift, the viewport for the left-eye image may be (0, 0, 5, 9), and the viewport for the right-eye image may be (5, 0, 5, 9). Graphics driver wrapper 16 may shift the viewport for the left-eye image by subtracting 2 (e.g., the value of Vps) to shift the ZDP. In this example, the viewport for the left-eye image may become (−2, 0, 5, 9). Graphics driver wrapper 16 may shift the viewport for the right-eye image by adding 2 (e.g., the value of Vps) to shift the ZDP. In this example, the viewport for the right-eye image may become (7, 0, 5, 9). Similar calculations may be performed to determine the viewport after viewport stretch.

For the viewport shifted left-eye image, GPU 20 may crop some of the pixels of the left-eye image. For example, the coordinates of the display may be (0, 0, 9, 9) in this example. However, the coordinates for the viewport shifted left-eye image may be (−2, 0, 5, 9), which means that the viewport shifted left-eye image starts further left than the left edge of the display. Fixed-function pipeline 24 of GPU 20 may crop the pixels whose coordinates are further left than the left edge of the display. Similarly, for the viewport shifted right-eye image, GPU 20 may crop some of the pixels of the right-eye image. For example, the coordinates for the viewport shifted right-eye image may be (7, 0, 5, 9), which means that the viewport shifted right-eye image ends further right than the right edge of the display. Fixed-function pipeline 24 of GPU 20 may crop the pixels whose coordinates are further right than the right edge of the display. Again, similar calculations may be performed for viewport stretching.

The location of the viewport shifted or shifted and stretched ZDP (e.g., the resulting ZDP from the viewport shifted or shifted and stretched left-eye image and right-eye image) may be determined by the following equation:

$$ZDP'=z_{near}*ZDP*D/(z_{near}*D-ZDP*Vps), \quad \text{(equation 6)}$$

where ZDP' equals the location of the viewport shifted ZDP, $z_{near}$, is defined in the PRJ matrix (equation 4), D is the half distance between the left eye and right eye of the viewer, ZDP is the original location (e.g., prior to viewport shifting), and Vps is the amount by which the left boundary of the left-eye image and right-eye image are shifted.

In some instances, the value of $z_{near}$, ZDP, D, or Vps may not be available to the viewer. In these instances, the viewer may still modify the Vps value (e.g., increment the value or decrement the value) until the viewer finds a desirable viewport shifted ZDP or shifted and stretched ZDP. The modification of the Vps value may not be necessary in every example, and a preprogrammed Vps value may provide a suitably rich and realistic viewing experience for most viewers.

In some examples, the techniques described in this disclosure may modify the instructions to generate an image for a mono view to generate images for stereoscopic view during execution or run time. For example, a viewer may select application 32 for execution, which may require the execution of vertex shader 28 for processing the graphics generated by the execution of application 32. While application 32 is executing or running on device 10, graphics driver 14, graphics driver wrapper 16, and compiler 18 may perform their respective functions to modify the source code of vertex shader 28 and generate the object code for modified vertex shader 30. For example, graphics driver wrapper 16 may intercept the glViewport command issued by application 32 during run time, and block the transmission of the glViewport command issued by application 32 to GPU 20 during run time, in some examples, or allow the transmission of the glViewport command issued by application 32 to GPU 20 in other examples. In either example, graphics driver wrapper 16 may modify the glViewport command issued by application 32 so that the glViewport command executed by GPU 20 is the modified glViewport command modified by graphics driver wrapper 16.

Moreover, when application 32 issues the draw command (e.g., glDraw), graphics driver wrapper 16 may capture and block this glDraw from transmission to GPU 20. This glDraw command, which application 32 issued during run time, may function as the trigger that causes graphics driver wrapper 16 to include instructions that define the viewport for the left-eye image and the right-eye image, in a manner described above, and include two glDraw commands to cause GPU 20 to generate graphics content for the left-eye image and the right-eye image.

Also, although the above examples are described in the context where the graphics driver wrapper 16 adds instructions to and modifies the instructions of vertex shader 28 and modifies the instruction that defines the viewport, aspects of this disclosure are not so limited. In alternate examples, rather than graphics driver wrapper 16, it may be possible for graphics driver 14 or compiler 18 to modify the instructions of vertex shader 28 and the instruction that defines the viewport. However, these examples may require modification to graphics driver 14 or compiler 18.

Modification to graphics driver 14 or compiler 18 may be more difficult than developing graphics driver wrapper 16 and having graphics driver wrapper 16 perform the functions described in this disclosure so that GPU 20 generates the left-eye image and the right-eye image for the stereoscopic view. For example, device 10 may have been loaded with preexisting graphics driver 14 and compiler 18, and it may be difficult to change graphics driver 14 and compiler 18. By adding graphics driver wrapper 16 that performs the modification to vertex shader 28, the example techniques may not require modification to preexisting graphics driver 14 and compiler 18.

Furthermore, the techniques described above may allow GPU 20 to generate images for the stereoscopic view without modification to application 32. For example, some other techniques to generate stereoscopic view may require the developers of application 32 to modify the source code of application 32 to generate pixel values for the left-eye and right-eye images. These techniques required assistance from the developer of application 32 to modify their applications for stereoscopic view, which may be potentially cumbersome task for the developer of application 32. The example techniques described above may provide stereoscopic view for application 32, developed for mono view, without any assistance from the developer of application 32.

Also, the techniques described above may not require multiple calls to system memory 26 for generating the left-eye and right-eye images for stereoscopic view. For example, in some other techniques to generate stereoscopic view, a GPU would generate the left-eye image. Upon completion of the generation of the left-eye image, the GPU would utilize depth information stored in system memory 26 while generating the left-eye image to generate the right-eye image. However, repeated calls to system memory 26 to retrieve the depth information may be computationally expensive and may require excessive power consumption.

The example techniques described above may not require such multiple calls to system memory 26 for the depth information for the left-eye image to generate the right-eye image. For example, graphics driver wrapper 16 may modify the source code of vertex shader 28 and the instruction that defines the viewport to generate the left-eye and right-eye images independently from one another, without necessarily needing the depth information of one image to generate the other image. For instance, the instructions that are added into vertex shader 28 and the modification of the glViewport commands and the issuances of two glDraw commands, as described above, may not require any depth information, and in some examples, generate the left-eye image without requiring information about right-eye image, and vice-versa. In this way, the techniques described in this disclosure may reduce the number of access to system memory 26 for generating the stereoscopic view, as compared to other techniques.

Moreover, as described above, the glViewport command is utilized by a fixed-function unit of fixed-function pipeline 24 (e.g., the viewport transformation unit of fixed-function pipeline 24), and not by shader processor 22. In this way, the source code for vertex shader 28 may not need to be modified to force rendering of the left-eye image to a first portion of the display (e.g., the left-half of the display), and force rendering of the right-eye image to the other portion of the display (e.g., the right-half of the display). Rather, a fixed-function unit of fixed-function pipeline 24 may apply the modified glViewport commands to constrain the left-eye image to its portion of the display and the right-eye image to its portion of the display. This may reduce and simplify the modifications to vertex shader 28, which may increase the computational efficiency of shader processor 22.

For example, in accordance with the techniques of the disclosure, graphics driver wrapper 16 may modify the source code of vertex shader 28 to provide the displacement between the left-eye image and the right-eye image. For instance, when generating the clipping vertex coordinates for the left-eye image and the right-eye image, shader processor 22, which is executing the object code of modified vertex shader 30, may be oblivious to where the generated graphics data will be displayed. In other words, shader processor 22 may not be tasked with defining where the graphics data is to be presented for the left-eye image and the right-eye image. The viewport transformation unit of fixed-function pipeline 24, which is a unit external to shader processor 22, may be tasked with constraining the left-eye and right-eye images to their respective portions of the display. In this way, shader processor 22 may not need to waste computational cycles in determining where the left-eye and right-eye images should be displayed. The hard-wired functionality of the viewport transform unit of fixed-function pipeline 24 may be more suitable for constraining the left-eye image the right-eye image to their respective portions on the display, as compared to shader processor 22.

For example, if the source code for vertex shader 28 were modified to determine where the left-eye and right-eye images should be displayed so as to control the zero disparity plane (ZDP), it may require shader processor 22 to determine the coordinates for each vertex of each of the primitives in the left-eye and right-eye images. This may require shader processor 22 to perform multiple computational cycles which may reduce the efficiency of shader processor 22. By performing the viewport transformation, and also the viewport shift or shift and stretch (e.g., further modifying the viewport based on the Vps value to adjust the ZDP), in the viewport transformation unit of fixed-function pipeline 24, aspects of this disclosure may provide richer stereoscopic view without wasted computation cycles in the shader processor 22.

As described above, graphics driver wrapper 16 may include the gl_Position.x+=($z_{near}$*$w_{world}$/(R-L)/2)*X or just gl_Position.x+=X command into the source code of vertex shader 28 that modifies the value of the gl_Position.x variable. The following provides the reasons for such an inclusion of instructions into the source code of vertex shader 28.

As indicated above in equation (1), Vclip=PRJ*Veye=PRJ*MVT*Vworld. The equation for Vclip may be modified to generate clipping coordinates for the left-eye and the right-eye. For example, the clipping coordinates for the left-eye and right-eye may be:

Vclip_left-eye=PRJ*VTleft-eye*Veye=PRJ*VTleft-eye*MVT*Vworld   (equation 7), and Vclip_right-eye=PRJ*VTright-eye*Veye=PRJ*VTright-eye*MVT*Vworld   (equation 8).

VTleft-eye and VTright-eye may be 4×4 matrices that are based on an assumed distance of the left eye and right eye away from the mono view. The coordinates of the mono view may be (0, 0, 0), and the left eye may be considered as being located at (−D, 0, 0), and the right eye may be considered as being located at (D, 0, 0). In other words, the (0, 0, 0) location may be considered as being in the middle of the right eye and the left eye of the viewer. If the left eye is considered to be located −D away from the middle of the right eye and the left eye, and right eye is considered to be located +D away from the middle of the right eye and the left eye, then D indicates half of the distance between the right eye and left eye of the viewer.

The matrices for VTleft-eye and VTright-eye may be defined as:

$$VT_{left\_eye} = \begin{bmatrix} 1 & 0 & 0 & D \\ 0 & 1 & 0 & 0 \\ 0 & 0 & 0 & 1 \\ 0 & 0 & 0 & 1 \end{bmatrix} \text{ and } VT_{right\_eye} = \begin{bmatrix} 1 & 0 & 0 & -D \\ 0 & 1 & 0 & 0 \\ 0 & 0 & 1 & 0 \\ 0 & 0 & 0 & 1 \end{bmatrix}$$

VTleft-eye and VTright-eye may be rewritten as a sum of two matrices. For example, VTleft-eye may be rewritten as $$VT_{left\_eye} = \begin{bmatrix} 1 & 0 & 0 & 0 \\ 0 & 1 & 0 & 0 \\ 0 & 0 & 1 & 0 \\ 0 & 0 & 0 & 1 \end{bmatrix} + \begin{bmatrix} 0 & 0 & 0 & D \\ 0 & 0 & 0 & 0 \\ 0 & 0 & 0 & 0 \\ 0 & 0 & 0 & 0 \end{bmatrix}.$$

VTright-eye may be rewritten as $$VT_{right\_eye} = \begin{bmatrix} 1 & 0 & 0 & 0 \\ 0 & 1 & 0 & 0 \\ 0 & 0 & 1 & 0 \\ 0 & 0 & 0 & 1 \end{bmatrix} + \begin{bmatrix} 0 & 0 & 0 & -D \\ 0 & 0 & 0 & 0 \\ 0 & 0 & 0 & 0 \\ 0 & 0 & 0 & 0 \end{bmatrix}.$$

By substituting the VTleft-eye matrix into the equation for Vclip_left-eye (equation 7), Vclip_left-eye equals:

$$\text{Vclip\_left-eye} = PRJ * \begin{bmatrix} 1 & 0 & 0 & 0 \\ 0 & 1 & 0 & 0 \\ 0 & 0 & 1 & 0 \\ 0 & 0 & 0 & 1 \end{bmatrix} * MVT * Vworld + \quad \text{(equation 9)}$$

$$PRJ * \begin{bmatrix} 0 & 0 & 0 & D \\ 0 & 0 & 0 & 0 \\ 0 & 0 & 0 & 0 \\ 0 & 0 & 0 & 0 \end{bmatrix} * MVT * Vworld.$$

By substituting the VTright-eye matrix into the equation for Vclip_right-eye (equation 8), Vclip_right-eye equals:

$$VTclip\_right\text{-}eye = PRJ * \begin{bmatrix} 1 & 0 & 0 & 0 \\ 0 & 1 & 0 & 0 \\ 0 & 0 & 1 & 0 \\ 0 & 0 & 0 & 1 \end{bmatrix} * MVT * Vworld + \quad \text{(equation 10)}$$

$$PRJ * \begin{bmatrix} 0 & 0 & 0 & -D \\ 0 & 0 & 0 & 0 \\ 0 & 0 & 0 & 0 \\ 0 & 0 & 0 & 0 \end{bmatrix} * MVT * Vworld.$$

In both equations 9 and 10, e.g., for Vclip_left-eye and Vclip_right-eye, $$PRJ * \begin{bmatrix} 1 & 0 & 0 & 0 \\ 0 & 1 & 0 & 0 \\ 0 & 0 & 1 & 0 \\ 0 & 0 & 0 & 1 \end{bmatrix} * MVT * Vworld$$

can be simplified to PRJ*MVT*Vworld because $$\begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

is a unity matrix and is equivalent to multiplying by one.

As described above in equation 1, PRJ*MVT*Vworld equals Vclip. Therefore, the Vclip_left-eye and Vclip_right-eye equations (e.g., equations 9 and 10, respectively) can be rewritten as:

Vclip_left-eye = (equation 11)

$$Vclip + PRJ * \begin{bmatrix} 0 & 0 & 0 & D \\ 0 & 0 & 0 & 0 \\ 0 & 0 & 0 & 0 \\ 0 & 0 & 0 & 0 \end{bmatrix} * MVT * Vworld,$$

and

Vclip_left-eye = (equation 12)

$$Vclip + PRJ * \begin{bmatrix} 0 & 0 & 0 & -D \\ 0 & 0 & 0 & 0 \\ 0 & 0 & 0 & 0 \\ 0 & 0 & 0 & 0 \end{bmatrix} * MVT * Vworld.$$

By substituting the matrices for the PRJ and MVT (equations 4 and 5, respectively), and performing the matrix multiplication of equation 11, the equation for Vclip_left-eye may simplify to:

$$\text{Vclip\_left-eye} = Vclip + \frac{z_{near}}{(R-L)/2} * D * w_{world} * \begin{bmatrix} 1 \\ 0 \\ 0 \\ 0 \end{bmatrix},$$

and more specifically to:

$$V_{clip\_left-eye} = \begin{bmatrix} x_{left\_eye\_clip} \\ y_{left\_eye\_clip} \\ z_{left\_eye\_clip} \\ w_{left\_eye\_clip} \end{bmatrix} \quad \text{(equation 13)}$$

$$= \begin{bmatrix} x_{clip} + \frac{z_{near}}{(R-L)/2} * D * w_{world} \\ y_{clip} \\ z_{clip} \\ w_{clip} \end{bmatrix}.$$

With similar substitutions to those for Vclip_left-eye, the Vclip_right-eye equation may simplify to:

$$\text{Vclip\_right-eye} = Vclip - \frac{z_{near}}{(R-L)/2} * D * w_{world} * \begin{bmatrix} 1 \\ 0 \\ 0 \\ 0 \end{bmatrix},$$

and more specifically to:

$$V_{clip\_right-eye} = \begin{bmatrix} x_{right\_eye\_clip} \\ y_{right\_eye\_clip} \\ z_{right\_eye\_clip} \\ w_{right\_eye\_clip} \end{bmatrix} \quad \text{(equation 14)}$$

$$= \begin{bmatrix} x_{clip} - \frac{z_{near}}{(R-L)/2} * D * w_{world} \\ y_{clip} \\ z_{clip} \\ w_{clip} \end{bmatrix}.$$

From equations 13 and 14, it can be seen that by adding the constant $$\frac{z_{near}}{(R-L)/2} * D * w_{world}$$

to the calculated $x_{clip}$ coordinate, and keeping all other clipping coordinates the same, vertex shader 28 may generate the clipping coordinates for the left-eye image. Similarly, by subtracting the constant $$\frac{z_{near}}{(R-L)/2} * D * w_{world}$$

from the $x_{clip}$ coordinate, and keeping all other clipping coordinates the same, vertex shader 28 may generate the clipping coordinates for the right-eye image. For at least these reasons, graphics driver wrapper 16 may include the instruction gl_Position.x+=$z_{near}$*$w_{world}$/((R−L)/2)*X, where X equals +D to generate the left-eye image, and where X equals −D to generate the right-eye image.

In some examples, it may be possible to further simplify the gl_Position.x+=command to just gl_Position.x+=X. For example, it is common for the $w_{world}$ variable to be set to 1. Also, OpenGL, OpenGL ES, and OpenGL ES 2.0, with programmable shaders, define a frustum to be:

$$\cot(fov_x) = \frac{z_{near}}{(R-L)/2},$$

where $fov_x$ is a frustum defined in OpenGL, OpenGL ES, and OpenGL ES 2.0. It is also common for the viewing angle to be set to 45 degrees, which means that $\cot(fov_x)$ equals 1. This means that $$\frac{z_{near}}{(R-L)/2} \text{ equals } 1.$$

Therefore, in these examples, $$\frac{z_{near} * w_{world}}{(R-L)/2} * X$$

simplifies to just X (e.g., $$\frac{z_{near}}{(R-L)/2} \text{ equals } 1,$$

and $w_{world}$ equals 1). In these examples, the gl_Position.x+=variable may simplify to gl_Position.x+=X.

Accordingly, equations 7-14 provide mathematical foundation that illustrates the reasons why adding the instruction gl_Position.x+=($z_{near}$*$w_{world}$/(R−L)/2)*X, or gl_Position.x+=X to vertex shader 28 may be sufficient to displace the mono view image to generate stereoscopic view, when executed twice, and where X equals +D in the first execution, and −D in the second execution. In this way, the techniques of this disclosure may provide for a minor modification to the source code of vertex shader 28, which is designed for mono view, such that when the modified source code is compiled and executed (e.g., the execution of the object code of modified vertex shader 30), the resulting images may provide the viewer with a stereoscopic view. The stereoscopic view may provide the viewer with a 3D experience, which may be richer, fuller experience, as compared to viewing an image limited by the 2D area of the display.

In some examples, graphics driver wrapper 16 may include the command gl_Position.x+=X even when ($z_{near}$*$w_{world}$/(R−L)/2) does not simplify to 1 (e.g., where cot($fov_x$) does not equal 1 because the viewing angle is not 45 degrees and/or $w_{world}$ does not equal 1). For instance, ($z_{near}$*$w_{world}$/(R−L)/2) may be constant because $z_{near}$, $w_{world}$, R, and L are each constants. Since ($z_{near}$*$w_{world}$/(R−L)/2) is a constant, the value of ($z_{near}$*$w_{world}$/(R−L)/2)*X is a constant because X is a constant. In this case, ($z_{near}$*$w_{world}$/(R−L)/2)*X may be collapsed to represent a single constant, which may simply be X. In this case, the value of X may be user specified or preprogrammed. For instance, in the above examples, X equaled +D for the left-eye image and −D for the right-eye image. In this current example, X may equal ($z_{near}$*$w_{world}$/(R−L)/2)*D for the left-eye image and ($z_{near}$*$w_{world}$/(R−L)/2)*−D for the right-eye image, where ($z_{near}$*$w_{world}$/(R−L)/2) and D may be user specified for preprogrammed values, if the $z_{near}$, $w_{world}$, R, and L values are not available to shader processor 22.

If the $z_{near}$, $w_{world}$, R, and L values are available to the shader processor 22, shader processor 22 may determine the value of ($z_{near}$*$w_{world}$/(R−L)/2) and multiple that value with +D or −D based on whether GPU 20 is generating graphics content for the left-eye image or the right-eye image. Also, again, if cot($fov_x$) and $w_{world}$ both equal 1, then ($z_{near}$*$w_{world}$/(R−L)/2) may simplify to 1.

Figure 2:
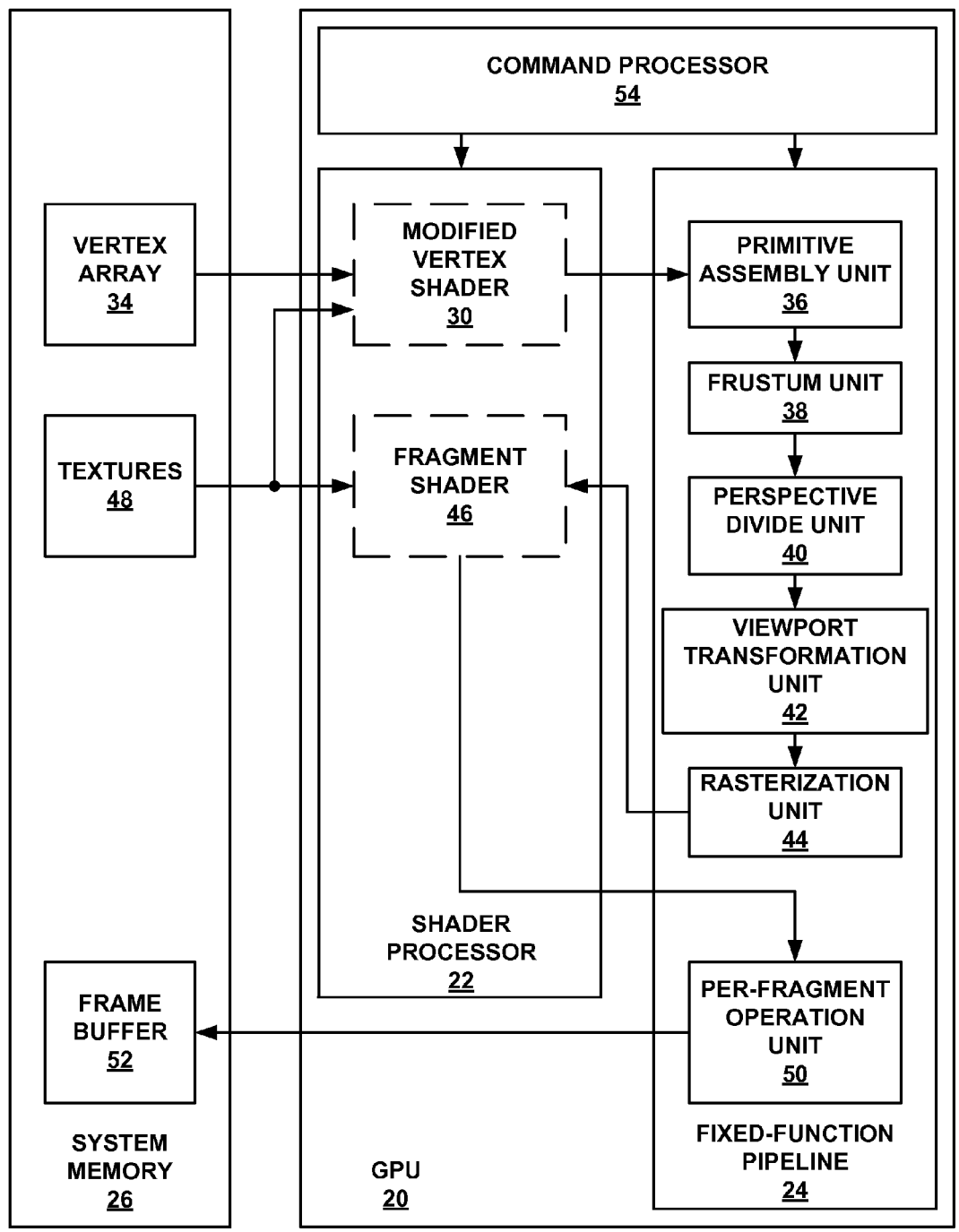
FIG. 2 is a block diagram illustrating an example of a graphics processing unit (GPU) that may implement one or more example techniques described in this disclosure.

FIG. 2 is a block diagram illustrating an example of a graphics processing unit (GPU) that may implement one or more example techniques described in this disclosure. For example, FIG. 2 illustrates the components of GPU 20 in greater detail. As illustrated in FIG. 2, GPU 20 includes command processor 54, shader processor 22, and fixed-function pipeline 24. Command processor 54 may function as the interface between GPU 20 and application processor 12. For instance, command processor 54 may receive commands from application processor 12, and may determine whether the commands should be forwarded to shader processor 22 or fixed-function pipeline 24.

As one example, as described above, application processor 12, executing application 32, may instruct GPU 20 to execute the object code of modified vertex shader 30. In this example, command processor 54 may receive the command from application processor 12, and may instruct shader processor 22 to execute the object code of modified vertex shader 30. As another example, as described above, graphics driver wrapper 16 may modify the glViewport command issued by application 32, and provide the modified glViewport commands to GPU 20. In this example, command processor 54 may receive the modified glViewport commands, and determine that this command is for viewport transformation unit 42 of fixed-function pipeline 24. Command processor 54 may forward the modified glViewport commands to viewport transformation unit 42 for applying the viewports for the left-eye image and right-eye image.

For example, as described above, application 32 may issue a glDraw command that graphics driver wrapper 16 blocks from transmission to GPU 20. The glDraw command may trigger graphics driver wrapper 16 into issuing a first instruction to shader processor 22 to execute the object code of modified vertex shader 30. In turn, shader processor 22 executes the object code of modified vertex shader 30, and stores the resulting clipping coordinates in its local memory or system memory 26. The glDraw command also causes graphics driver wrapper 16 to issue a first modified glViewport instruction, which is received by command processor 54. Then, graphics driver wrapper 16 issues the first glDraw command which is received by command processor 54. Command processor 54, in response, causes the fixed-function units of fixed-function pipeline 24 and shader processor 22 to perform their respective functions to generate the graphics content for a first image of the stereoscopic view (e.g., the left-eye image). For example, as discussed in more detail, in response to the first glDraw command, viewport transformation unit 42 constrains the first image to a first portion of the display, and per-fragment operation unit 50 outputs the graphics content of the first image to frame buffer 52.

After the first image of the stereoscopic view is stored in frame buffer 52, GPU 20 repeats the steps to generate the graphics content for the second image of the stereoscopic view. For example, graphics driver wrapper 16 issues a second instruction to shader processor 22 to execute the object code of modified vertex shader 30. In turn, shader processor 22 executes the object code of modified vertex shader 30, and stores the resulting clipping coordinates in its local memory or system memory 26. Graphics driver wrapper 16 also issues a second modified glViewport instruction, which is received by command processor 54. Then, graphics driver wrapper 16 issues the second glDraw command which is received by command processor 54. Command processor 54, in response, causes the fixed-function units of fixed-function pipeline 24 and shader processor 22 to perform their respective functions to generate the graphics content for a second image of the stereoscopic view (e.g., the right-eye image). For example, in response to the second glDraw command, viewport transformation unit 42 constrains the second image to a second portion of the display, and per-fragment operation unit 50 outputs the graphics content of the second image to frame buffer 52. This functionality of GPU 20 is described in more detail in the following examples.

As illustrated in dashed boxes in FIG. 2, shader processor 22 includes modified vertex shader 30 and fragment shader 46. The dashed boxes are to indicate that shader processor 22 may not actually include modified vertex shader 30 and fragment shader 46. Rather, shader processor 22 may execute the object code of modified vertex shader 30 and fragment shader 46. The object of modified vertex shader 30 and fragment shader 46 may be stored in system memory 26.

Fixed-function pipeline 24 may include one or more fixed-function units such as primitive assembly unit 36, frustum unit 38, perspective divide unit 40, viewport transformation unit 42, rasterization unit 44, and per-fragment operation unit 50. Each of these fixed-function units of fixed-function pipeline 24 may be hardware units that are hardwired to perform specific graphics related functions. Although these fixed-function units of fixed-function pipeline 24 are illustrated as separate components, aspects of this disclosure are not so limited. One or more of the fixed-function units of fixed-function pipeline 24 may be combined together into a common fixed-function unit. Also, there may be more fixed-function units of fixed-function pipeline 24 than those illustrated in FIG. 2. The one or more fixed-function units of fixed-function pipeline 24 are illustrated separately to ease understanding.

Moreover, the specific ordering of the fixed-function units of fixed-function pipeline 24 is illustrated for example purposes and should not be considered limiting. For instance, it may be possible to reorder the fixed-function units of fixed-function pipeline 24. As one example, one of the functions of per-fragment operation unit 50 may be to cull pixels that are occluded by overlapping pixels. It may be possible for this function to be performed earlier in fixed-function pipeline 24.

These fixed-function units of fixed-function pipeline 24 may provide very limited functional flexibility, as compared to shader processor 22. For example, shader processor 22 may be specifically designed to execute programmable shader programs such as modified vertex shader 30 and fragment shader 46. These shader programs cause shader processor 22 to function in the manner defined by the shader programs. In other words, shader programs may define the functionality of shader processor 22, whereas the functionality of the fixed-function units of fixed-function pipeline 24 is set.

As described above, graphics driver wrapper 16 may instruct GPU 20 to execute the object code of modified vertex shader 30 twice, where the first execution is for the generation of clipping coordinates for vertices of one of the images of stereoscopic view (e.g., left-eye image) and the second execution is for the generation of clipping coordinates for vertices of the other image of stereoscopic view (e.g., right-eye image). In response, to each of these instructions to execute the object code of modified vertex shader 30, command processor 54 may instruct shader processor 22 to retrieve the object code of modified vertex shader 30 and execute it. As described above, compiler 18 may compile the source code of the modified vertex shader and store the resulting object code as the object code of modified vertex shader 30. As illustrated in FIG. 2, modified vertex shader 30 may receive vertex array 34 and textures 48 as inputs. Vertex arrays 34 may include information to generate the pixel values for the vertices generated by application 32 (e.g., the coordinates of the vertices, color values of the vertices, and transparency values of the vertices), as described above. For example, the coordinates of the vertices of vertex array 34 may be the world coordinates as defined by application 32.

Textures 48 may be pixel values for textures that overlay over the generated graphics to provide a more realistic view of the graphics content.

Modified vertex shader 30, executing on shader processor 22, may generate the clipping coordinates for each of the vertices. For example, modified vertex shader 30 may convert the world coordinates of the vertices as defined by application 32 and stored in vertex array 34 into clipping coordinates for each of the vertices by performing the matrix multiplication of equation 1, as discussed above with respect to FIG. 1. Furthermore, modified vertex shader 30, executing on shader processor 22, may update the gl_Position.x variable for the clipping coordinates of each of the vertices to provide the displacement for the left-eye image, in the first execution of the object code of modified vertex shader 30, and to provide the displacement for the right-eye image, in the second execution of the object code of modified vertex shader 30. Also, modified vertex shader 30 may perform additional, conventional vertex shader tasks. For example, modified vertex shader 30 may perform lighting functions on the vertices.

After modified vertex shader 30 performs the model view transformation (e.g., conversion of the world view coordinates to clipping coordinates, including the displacement with the gl_Position.x+=command), modified vertex shader 30 provides the clipping coordinates for the vertices to primitive assembly unit 36 of fixed-function pipeline 24. Primitive assembly unit 36 may utilize the clipping coordinates for the vertices to assemble the vertices into primitives. For example, primitive assembly unit 36 may assemble a plurality of triangles based on the clipping coordinates for the vertices, where the vertices of each of the triangles correspond to vertices received from modified vertex shader 30. The plurality of triangles is one example of primitives. In general, primitive assembly unit 36 may assemble the received vertices into any polygon based on the clipping coordinates for the received vertices.

Primitive assembly unit 36 may transmit the assembled primitives to frustum unit 38. Frustum unit 38 may determine whether the assembled primitives are within a view volume. For example, as described above, OpenGL, OpenGL ES, and OpenGL ES 2.0 may define a particular view volume as (fov$_x$). However, the frustum may be user definable using, for example, the glFrustum function. Frustum unit 38 may determine whether a primitive is fully within the view volume, fully external to the view volume, or partially within the view volume and partially external to the view volume. Frustum unit 38 may cull, from further processing, primitives that are fully external to the view volume and portions of primitives are that external to the view volume. Frustum unit 38 may keep, for further processing, primitives that are fully within the view volume and portions of primitives that are within the view volume.

Frustum unit 38 may transmit the remaining primitives and portions of primitives to perspective divide unit 40. Perspective divide unit 40 may expand or shrink primitives based on their depth. For example, each of the primitives may be defined by x, y, and z coordinates. The z coordinate may indicate how close or away the primitive is. It should be noted that at this stage, GPU 20 is generating graphics content for one of the images for the stereoscopic view. Therefore, the concept of proximity of a primitive is in the context of a mono view, not a stereoscopic view.

For instance, perspective divide unit 40 may shrink some primitives, and expand other primitives. This may create a perception that the shrunk primitives are further away compared to the expanded primitives in a mono view. As described above, it is when these mono view images are displayed that the viewer perceives stereoscopic view. In other words, perspective divide unit 40 may cause the left-eye image and the right-eye image to be 3D images that are displayed in the 2D area of the display. When the viewer views these 3D images, the displacement caused by the addition of the gl_Position.x+=command, in the left-eye image and the right-eye image, causes the viewer to perceive the stereoscopic 3D (S3D) image that encompasses a 3D volume.

Perspective divide unit 40 may transmit the primitives to viewport transformation unit 42. Viewport transformation unit 42 modifies the size and location of the image to fit the defined viewport. For example, prior to the viewport transformation unit 42, modified vertex shader 30 and the fixed-function units of fixed-function pipeline 24 process graphics data as if the image is to be displayed on the entirety of the display. The function of viewport transformation unit 42 may be to modify the size and location of the image so that the image is constrained to the defined viewport.

For instance, as described above, after the first execution of the object code of vertex shader 30, which may generate graphics content for the left-eye image (e.g., clipping coordinates for vertices), graphics driver wrapper 16 may modify the viewport of the left-eye image to constrain the left-eye image to the left-half of the display. For example, after the first execution of the object code of vertex shader 30, graphics driver wrapper 16 may modify the glViewport (0, 0, width, length) command, which was previously issued by application 32 and blocked from GPU 20, to glViewport (0, 0, width/2, length), and provide this first modified glViewport command to GPU 20. Command processor 54 may provide the first modified glViewport command to viewport transformation unit 42. Viewport transformation unit 42 may then modify the sizes of the primitives received from perspective divide unit 40 so that these primitives are constrained to the left-half of the display, in this example. For instance, perspective divide unit 40 may modify the sizes of the primitives relative to one another so that some primitives appear closer than other primitives. Viewport transformation unit 42 may proportionally modify the size and location of the primitives such that the primitives are constrained to the left-half of the display.

After the second execution of the object code of vertex shader 30, viewport transformation unit 42 may perform similar functions, but for the right-eye image. For example, the second execution of the object code of vertex shader 30 may be for the generation of graphics content for the right-eye image (e.g., clipping coordinates for vertices). After this second execution of the object code of vertex shader 30, graphics driver wrapper 16 may modify the glViewport (0, 0, width, length) command, which was previously issued by application 32 and blocked from GPU 20, to glViewport (width/2, 0, width/2, length), and provide this second modified glViewport command to GPU 20. Command processor 54 may forward the second modified glViewport command to viewport transformation unit 42. Viewport transformation unit 42 may proportionally modify the size and location of the primitives such that the primitives are constrained to the right-half of the display. In this way, GPU 20 may be operable to generate left-eye and right-eye images for the stereoscopic view from a mono view image generated by application 32 during run-time of application 32, and without relying on depth information to generate the right-eye image from the left-eye image, and vice versa.

Furthermore, viewport transformation unit 42 may perform the viewport shift or viewport shift and stretch, as described above. For example, as described above, the viewer may provide a Vps value, or the Vps value may be preprogrammed, where the Vps value indicates the amount by which the viewport for the left-eye image and the right-eye image should shifted or shifted and stretched. In this example, viewport transformation unit 42 may be operable to perform the viewport shifting and stretching as well. The viewport shifting or shifting and stretching may cause the perceived stereoscopic view to pop out further from the display, not pop out as much from the display, not push into the display, or push further into the display.

For viewport shifting or shifting and stretching, command processor 54 may retrieve the user provided or preprogrammed Vps value, and provide the Vps value to viewport transformation unit 42. In this example, viewport transformation unit 42 may receive the modified glViewport command for the left-eye image as glViewport (0–Vps, 0, width/2, length) or glViewport (0–Vps, 0, width/2+Vps, length) and for the right-eye image as glViewport (width/2+Vps, 0, width/2, length) or glViewport (width/2, 0, width/2+Vps, length). Viewport transformation unit 42 may perform the viewport shifting of shifting and stretching for the left-eye image and the right-eye image, and perform any culling if the viewport extends outside of the display area of the display. As described above, the viewport shifting or shifting and stretching may provide the viewer with a richer stereoscopic view.

Viewport transformation unit 42 may forward the primitives to rasterization unit 44 after modifying the viewport after each of the first modified glViewport command and the second modified glViewport command. Rasterization unit 44 may convert the primitives into pixels of the display. For example, rasterization unit 44 may determine which pixels of the display are encompassed by each of the primitives. Rasterization unit 44 may also determine the location of each of these pixels on the displays.

Rasterization unit 44 may output its graphics data to fragment shader 46. Fragment shader 46, sometimes referred to as a pixel shader, may be a shader program that executes on shader processor 22. For example, the source code for fragment shader 46 may be stored in system memory 26, and compiler 18 may compile the source code of fragment shader 46 to generate the object code of fragment shader 46. Alternatively, system memory 26 may store the object code for fragment shader 46 without it necessarily being generated by compiler 18.

Fragment shader 46 may output the color values for each of the pixels on the display. For example, fragment shader 46 may define the color of each pixel based on a red-green-blue (RGB) component. Fragment shader 46 may utilize 8-bits to define the red component, 8-bits to define the green component, and 8-bits to define the blue component, as one illustrative example. Fragment shader 46 may output the color values to per-fragment operation unit 50.

Per-fragment operation unit 50 may cull pixels that are not viewable. For example, a pixel of a further away object may be overlapped by a pixel of a closer object, which per-fragment operation unit 50 may determine from a z-buffer. The overlapping may cause the pixel of the further away object to be fully occluded. In this case, per-fragment operation unit 50 may cull the overlapped pixel. Per-fragment operation unit 50 may also blend pixels together. For example, an overlapping pixel may be translucent so that it does not fully occlude the overlapped pixel. In this case, per-fragment operation unit 50 may blend the color of these pixels together.

The output of per-fragment operation unit 50 may be pixel values (e.g., color) for the pixels on the display. Per-fragment operation unit 50 may output the pixel values to frame buffer 52, of system memory 26, for temporary storage. Once frame buffer 52 is full, frame buffer 52 may store the pixel values for each of the pixels on the display.

Frame buffer 52 may be considered as a 2D array of storage locations. The number of storage locations with frame buffer 52 may be at least equal to the number of pixels of a display. Also, the storage locations within frame buffer 52 may correspond to a location on the display. For example, the top-left storage location within frame buffer 52 may correspond to the top-left pixel of the display, the storage location to the right of the top-left storage location within frame buffer 52 may correspond to the pixel to the right of the top-left pixel of the display, and so forth.

After the completion of the first glDraw command, the storage locations located in the left half of frame buffer 52 may store the pixel values for the left-eye image because the left half of frame buffer 52 may correspond to the left-half of the display. Similarly, after the completion of the second glDraw command, the storage locations located in the right half of frame buffer 52 may store the pixel values for the right-eye image because the right half of frame buffer 52 may correspond to the right half of the display. Therefore, after completion of the first and second glDraw commands, frame buffer 52 may store the pixel values for the left-eye image and the pixel values for the right-eye image.

Figure 3:
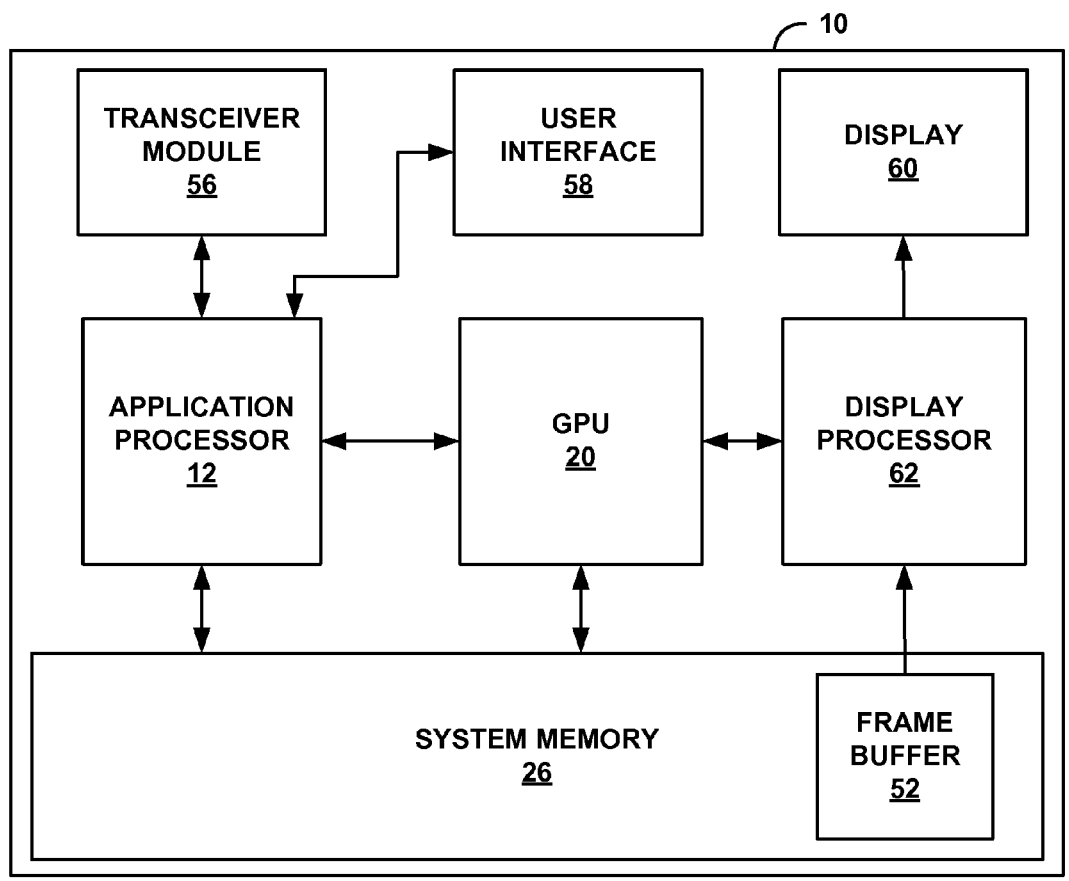
FIG. 3 is a block diagram illustrating the example device of FIG. 1 in further detail.

FIG. 3 is a block diagram illustrating the example device of FIG. 1 in further detail. For instance, FIG. 3 illustrates device 10 of FIG. 1 in further detail. For example, as indicated above, examples of device 10 include, but are not limited to, mobile wireless telephones, PDAs, video gaming consoles that include video displays, mobile video conferencing units, laptop computers, desktop computers, television set-top boxes, and the like.

As illustrated in FIG. 3, device 10 may include application processor 12, GPU 20, system memory 26, which includes frame buffer 52, transceiver module 56, user interface 58, display 60, and display processor 62. Application processor 12, GPU, and system memory 26 may be substantially similar or identical to application processor 12, GPU 20, and system memory 26 of FIGS. 1 and 2. For purposes of brevity, only the components that are shown in FIG. 3, but not shown in FIGS. 1 and 2 are described in detail.

Device 10, as illustrated in FIG. 3, may include additional modules or units not shown in FIG. 3 for purposes of clarity. For example, device 10 may include a speaker and a microphone, neither of which are shown in FIG. 3, to effectuate telephonic communications in examples where device 10 is a mobile wireless telephone, or a speaker where device 10 is a media player. Furthermore, the various modules and units shown in device 10 may not be necessary in every example of device 10. For example, user interface 58 and display 60 may be external to device 10 in examples where device 10 is a desktop computer or other device that is equipped to interface with an external user interface or display.

Examples of user interface 58 include, but are not limited to, a trackball, a mouse, a keyboard, and other types of input devices. User interface 58 may also be a touch screen and may be incorporated as a part of display 60. Transceiver module 56 may include circuitry to allow wireless or wired communication between device 10 and another device or a network. Transceiver module 56 may include one or more modulators, demodulators, amplifiers, antennas and other such circuitry for wired or wireless communication. Display 60 may comprise a liquid crystal display (LCD), an organic light emitting diode display (OLED), a cathode ray tube (CRT) display, a plasma display, a polarized display, or another type of display device.

Display processor 62 may be configured to cause display 60 to display stereoscopic view. There may be various techniques that display processor 62 may utilize to cause display 60 to display stereoscopic view, and aspects of this disclosure may utilize any of these techniques. For example, display processor 62 may retrieve the left-eye image from the left half of frame buffer 52, retrieve the right eye image from the right-half of frame buffer 52, and interleave the two images together to provide the stereoscopic view.

As another example, display processor 62 may control the refresh rate of display 60. In this example, during each refresh cycle, display processor 62 may cycle between the left-eye image and the right-eye image. For instance, display processor 62 may retrieve the left-eye image from the left half of frame buffer 52, expand the left-eye image to the entirety of display 60, and display left-eye image on display 60 for one refresh cycle. Then, for the next refresh cycle, display processor 62 may perform substantially similar functions, but for the right-eye image stored in the right half of frame buffer 52. In other words, display 60 may display the left-eye image, then the right-eye image, then the left-eye image, and so forth.

The viewer may be wearing specialized glasses that are synchronized with the refresh rate of display processor 62. For example, while display 60 is displaying the left-eye image, the specialized glasses may shutter close the right lens so that only the left eye of the viewer captures the left-eye image. Then, while display 60 is displaying the right-eye image, the specialized glasses may shutter close the left lens so that only the right eye of the viewer captures the right-eye image, and so forth. If the refresh rate is fast enough, the viewer perceives stereoscopic view where the image pops out of or pushes into display 60 and encompasses a 3D volume.

In some examples, some conventional display processors may not be configured to cause display 60 to display stereoscopic view. In these examples, the viewer may couple device 10 to a display that includes a display processor, such as display processor 62, which is configured to cause the display to present the stereoscopic view. For example, the viewer may couple device 10 to a stereoscopic view enabled television via transceiver module 56. For instance, the viewer may couple transceiver module 56 to the television via a high-definition multimedia interface (HDMI) wire. In this example, application processor 12 or GPU 20 may instruct transceiver module 56 to transmit the pixel values stored in frame buffer 52 to the display processor of the television. The display processor of this television may then cause the television to display the left-eye and right-eye images to form the stereoscopic view.

In these examples, it may still be possible for the display of device 10 to display the left-eye and right-eye images. However, because display processor 62 of device 10 may not be able to cause display 60 of device 10 to present the stereoscopic view, in this example, display 60 may display the left-eye image and the right-eye image side-by-side. For example, the left-half of display 60 may display the left-eye image, and the right-half of display 60 may display the right-eye image. This may be because of the viewport transformation described above. In this case, even with specialized glasses, the viewer may not experience the stereoscopic view simply by viewing display 60, but would experience stereoscopic view by viewing the stereoscopic view enabled television.

Figure 4:
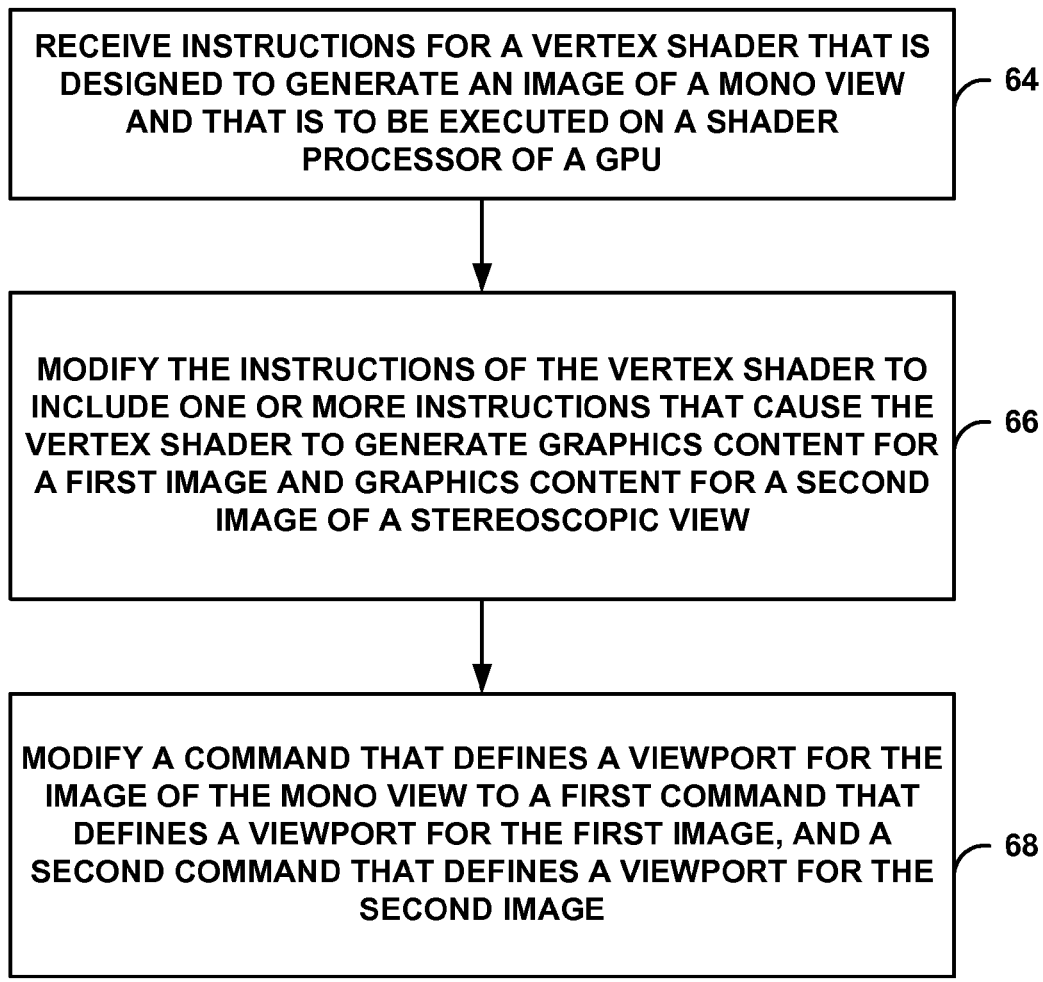
FIG. 4 is a flowchart illustrating an example operation in accordance with one or more example techniques described in this disclosure.

FIG. 4 is a flowchart illustrating an example operation in accordance with one or more example techniques described in this disclosure. For purposes of illustration, reference is made to FIGS. 1 and 2.

A processor may receive instructions for a vertex shader that is designed to generate an image of a mono view and that is to be executed on a shader processor of a graphics processing unit (GPU) (64). For example, application processor 12, via the execution of graphics driver wrapper 16, may receive instructions for vertex shader 28. As described above, vertex shader 28 may designed to generate graphics content for a mono view, and may be designed to be executed on shader processor 22 of GPU 20.

The processor may modify the instructions of the vertex shader to include one or more instruction that cause the vertex shader, when executed on the shader processor of the GPU, to generate graphics content for a first image of a stereoscopic view after a first execution of the vertex shader and graphics content for a second image of the stereoscopic view after a second execution of the vertex shader of a stereoscopic view (66). The first image may be the left-eye image and the second image may be the right-eye image.

For example, graphics driver wrapper 16 may receive the source code of vertex shader 28, and may include the gl_Position.x+=X command into the source code of vertex shader 28. Compiler 18 may compile the modified source code of vertex shader 28 to generate the object coded of modified vertex shader 30. Graphics driver wrapper 16 may cause shader processor 22 to execute the object code of modified vertex shader 30, and may provide shader processor 22 with the value of +D for X. After graphics driver wrapper 16 issues a first glDraw command, graphics driver wrapper 16 may cause shader processor 22 to again execute the object code of modified vertex shader 30, and may provide shader processor 22 with the value of −D for X.

A processor may modify a command that defines a viewport for the image of the mono view to a first command, for a fixed-function unit of the GPU that is different from the shader processor, that defines a viewport for the first image, and a second command, for the fixed-function unit of the GPU, that defines a viewport for the second image (68). In this example, the fixed-function unit may be the viewport transformation unit 42 of FIG. 2. As illustrated, and described above, viewport transformation unit 42 is different from shader processor 22.

As one example, graphics driver wrapper 16 may modify the glViewport (0, 0, width, length) command, which was previously issued by application 32, to glViewport (0, 0, width/2, length) command for rendering the left-eye image, and for rendering the right-eye image, graphics driver wrapper 16 may modify the glViewport (0, 0, width, length) command to glViewport (width/2, 0, width/2, length) command. In some examples, graphics driver wrapper 16 may shift or shift and stretch the viewports for the first and second images, as discussed above. In some examples, graphics driver wrapper 16 may shift or shift and stretch the viewport for the first and second images, while modifying the instruction that defines the viewport for the mono view, to define the viewports for the first and second images.

The following pseudo-code provides an example of the functionality of graphics driver wrapper 16 and application 32. This pseudo-code is meant to assist with understanding and should not be considered limiting.

1. Graphic driver wrapper 16 intercepts glShaderSource command issued by application 32 to intercept the source code of vertex shader 28.
2. Graphics driver wrapper 16 inserts "uniform float X" into the instructions of vertex shader 28, where "uniform" is a user defined standard attribute variable in OpenGL and OpenGL ES, with programmable shaders.
3. Graphics driver wrapper 16 inserts "gl_Position.x+=X" command in the source code of vertex shader 28.
4. Application 32 executes glCompileShader command that causes compiler 18 to compile the modified source code instructions of vertex shader 28 to generate the object code of modified vertex shader 30.
5. Application 32 executes the following commands to link to the object code of modified vertex shader 30:
   programObject=glCreateProgram( )
   glAttachShader(programObject, vertexShader);
   glAttachShader(programObject, fragmentShader);
   glLinkProgram(programObject)
6. Graphics driver wrapper 16 intercepts glDraw commands (e.g., glDrawArrays and glDrawElements) when called by application 32, and blocks the commands from being transmitted to GPU 20.
7. Graphics driver wrapper 16 issues the following commands:
   glGetInteger(GL_CURRENT_PROGRAM, &program); //to get pointer to the current vertex shader
   Modify the glViewport command to generate viewport for left-eye image as described above.
   p=glGetUniformLocation(program, X); //to get the pointer to uniform X
   glUniform1f(p,D); //to set the value of X equal to D.
   glDraw command //to cause GPU 20 to generate the graphics content for the left-eye image
8. Repeat the steps following from 7, with the following modifications to generate the graphics content for the right-eye image:
   Modify the glViewport command to generate the viewport for the right-eye image as described above.
   glUniform1f(p, −D) //to set the value of X equal to −D.
   glDraw command //to cause GPU 20 to generate the graphics content for the right-eye image.

In one or more examples, the functions described may be implemented in hardware, software, firmware, or any combination thereof. If implemented in software, the functions may be stored as one or more instructions or code on a computer-readable medium. Computer-readable media may include computer data storage media. Data storage media may be any available media that can be accessed by one or more computers or one or more processors to retrieve instructions, code and/or data structures for implementation of the techniques described in this disclosure. By way of example, and not limitation, such computer-readable media can comprise random access memory (RAM), read-only memory (ROM), EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

The invention claimed is:

1. A method comprising:
receiving, with a processor, instructions for a vertex shader that is configured to generate an image of a mono view and that is to be executed on a shader processor of a graphics processing unit (GPU);
modifying, with the processor, the instructions of the vertex shader to include one or more instructions that cause the vertex shader, when executed on the shader processor of the GPU, to generate graphics content for a first image of a stereoscopic view after a first execution of the vertex shader, and graphics content for a second image of the stereoscopic view after a second execution of the vertex shader;
issuing, with the processor, a command that defines a viewport for the image of the mono view; and
subsequent to issuing the command, modifying, with the processor, the issued command that defines the viewport for the image of the mono view to a first command, for a fixed-function unit of the GPU that is different from the shader processor, that defines a viewport for the first image, and a second command, for the fixed-function unit of the GPU, that defines a viewport for the second image.

2. The method of claim 1, further comprising:
executing, with the shader processor of the GPU, object code of the modified instructions of the vertex shader; and
executing, with the fixed-function unit of the GPU, the first command that defines the viewport for the first image, and the second command that defines the viewport for the second image.

3. The method of claim 1, wherein the first command is configured to constrain the first image to a first portion of a display, and the second command is configured to constrain the second image to a second portion of the display.

4. The method of claim 1, wherein modifying the issued command that defines the viewport for the image further comprises shifting or shifting and stretching the viewport for the first image, and shifting or shifting and stretching the viewport for the second image.

5. The method of claim 1, wherein modifying the issued command that defines the viewport for the image comprises modifying a glViewport (0, 0, width, length) command to the first command that comprises a glViewport (0, 0, width/2, length) command, and the second command that comprises a glViewport (width/2, 0, width/2, length) command, and wherein width equals a width of a display, and length equals a length of the display.

6. The method of claim 1, wherein modifying the issued command that defines the viewport for the image comprises modifying a glViewport (0, 0, width, length) command to the first command that comprises a glViewport (0−Vps, 0, width/2, length) command or a glViewport (0−Vps, 0, width/2+Vps, length) command, and the second command that comprises a glViewport (width/2+Vps, 0, width/2, length) command or a glViewport (width/2, 0, width/2+Vps, length) command, and wherein width equals a width of a display, length equals a length of the display, and Vps defines an amount by which the stereoscopic view pops out of or pushes into the display, and is a non-zero value.

7. The method of claim 1, wherein the fixed-function unit comprises a viewport transformation unit of a fixed-function pipeline of the GPU.

8. The method of claim 1, wherein receiving instructions of the vertex shader comprises receiving, with a graphics driver wrapper executing on the processor, the instructions of the vertex shader, wherein modifying the instructions of the vertex shader comprises modifying, with the graphics driver wrapper executing on the processor, the instructions of the vertex shader, wherein issuing, with the processor, the command that defines the viewport for the image of the mono view comprises issuing, with an application executing on the processor, the command that defines the viewport for the image of the mono view, and wherein modifying the issued command that defines the viewport comprises modifying, with the graphics driver wrapper executing on the processor, the issued command that defines the viewport.

9. The method of claim 1, wherein modifying the instructions of the vertex shader comprises adding an instruction into the vertex shader that modifies at least one clipping coordinate for the image of the mono view.

10. The method of claim 9, wherein adding the instruction into the vertex shader that modifies at least one clipping coordinate comprises adding an instruction into the vertex shader that updates a variable that stores the at least one clipping coordinate.

11. The method of claim 10, wherein adding the instruction into the vertex shader that updates the variable that stores the at least one clipping coordinate comprises adding an instruction for adding a constant value to the at least one clipping coordinate in the first execution, and adding an instruction for subtracting the constant value from the at least one clipping coordinate in the second execution.

12. The method of claim 10, wherein adding the instruction into the vertex shader that modifies the at least one clipping coordinate for the image of the mono view comprises adding a gl.Position.x+=X command, wherein X equals +D in the first execution, and −D in the second execution, and wherein D equals an estimation of half a distance between a left eye and a right eye of a viewer.

13. The method of claim 1, wherein modifying the instructions of the vertex shader to include one or more instructions comprises only adding an instruction into the vertex shader that modifies one clipping coordinate for the image of the mono view.

14. An apparatus comprising:
a graphics processing unit (GPU) that includes a shader processor and a fixed-function unit, different from the shader processor, of a fixed-function pipeline; and a processor configured to:
receive instructions for a vertex shader that is configured to generate an image of a mono view and that is to be executed on the shader processor of the GPU;
modify the instructions of the vertex shader to include one or more instructions that cause the vertex shader, when executed on the shader processor of the GPU, to generate graphics content for a first image of a stereoscopic view after a first execution of the vertex shader, and graphics content for a second image of the stereoscopic view after a second execution of the vertex shader;
issue a command that defines a viewport for the image of the mono view; and
subsequent to issuing the command, modify the issued command that defines the viewport for the image of the mono view to a first command, for the fixed-function unit of the GPU that is different from the shader processor, that defines a viewport for the first image, and a second command, for the fixed-function unit of the GPU, that defines a viewport for the second image.

15. The apparatus of claim 14, wherein the shader processor of the GPU is configured to execute object code of the modified instructions of the vertex shader, and wherein the fixed-function unit of the GPU is configured to execute the first command that defines the viewport for the first image, and the second command that defines the viewport for the second image.

16. The apparatus of claim 14, wherein the first command is configured to constrain the first image to a first portion of a display, and the second command is configured to constrain the second image to a second portion of the display.

17. The apparatus of claim 14, wherein the processor is further configured to modify the issued command that defines the viewport for the image to shift or shift and stretch the viewport for the first image, and shift or shift and stretch the viewport for the second image.

18. The apparatus of claim 14, wherein, to modify the issued command that defines the viewport for the image, the processor is configured to modify a glViewport (0, 0, width, length) command to the first command that comprises a glViewport (0, 0, width/2, length) command, and the second command that comprises a glViewport (width/2, 0, width/2, length) command, and wherein width equals a width of a display, and length equals a length of the display.

19. The apparatus of claim 14, wherein, to modify the issued command that defines the viewport for the image, the processor is configured to modify a glViewport (0, 0, width, length) command to the first command that comprises a glViewport (0−Vps, 0, width/2, length) command or a glViewport (0−Vps, 0, width/2+Vps, length) command, and the second command that comprises a glViewport (width/2+Vps, 0, width/2, length) command or a glViewport (width/2, 0, width/2+Vps, length) command, and wherein width equals a width of a display, length equals a length of the display, and Vps defines an amount by which the stereoscopic view pops out of the display, and is a non-zero value.

20. The apparatus of claim 14, wherein the fixed-function unit comprises a viewport transformation unit.

21. The apparatus of claim 14, wherein the processor is configured to execute a graphics driver wrapper to receive instructions for a vertex shader, modify the instructions of the vertex shader, and modify the issued command that defines a viewport for the image, and wherein the processor is configured to execute an application to issue the command that defines the viewport for the image of the mono view.

22. The apparatus of claim 14, wherein, to modify the instructions of the vertex shader, the processor is configured to add an instruction into the vertex shader that modifies at least one clipping coordinate for the image of the mono view.

23. The apparatus of claim 22, wherein, to add the instruction into the vertex shader that modifies at least one clipping coordinate, the processor is configured to add an instruction into the vertex shader that updates a variable that stores the at least one clipping coordinate.

24. The apparatus of claim 23, wherein, to add the instruction into the vertex shader that updates the variable that stores the at least one clipping coordinate, the processor is configured to add an instruction for adding a constant value to the at least one clipping coordinate in the first execution, and add an instruction for subtracting the constant value from the at least one clipping coordinate in the second execution.

25. The apparatus of claim 23, wherein, to add the instruction into the vertex shader that modifies the at least one clipping coordinate for the image of the mono view, the processor is configured to add a gl.Position.x+=X command, wherein X equals +D in the first execution, and −D in the second execution, and wherein D equals an estimation of half a distance between a left eye and a right eye of a viewer.

26. The apparatus of claim 14, wherein, to modify the instructions of the vertex shader to include one or more instructions, the processor is configured to only add an instruction into the vertex shader that modifies one clipping coordinate for the image of the mono view.

27. An apparatus comprising:
a graphics processing unit (GPU) that includes a shader processor and a fixed-function unit, different from the shader processor, of a fixed-function pipeline; and
a processor that includes:
means for receiving instructions for a vertex shader that is configured to generate an image of a mono view and that is to be executed on the shader processor of the GPU;
means for modifying the instructions of the vertex shader to include one or more instructions that cause the vertex shader, when executed on the shader processor of the GPU, to generate graphics content for a first image of a stereoscopic view after a first execution of the vertex shader, and graphics content for a second image of the stereoscopic view after a second execution of the vertex shader;
means for issuing a command that defines a viewport for the image of the mono view; and
means for modifying, subsequent to issuing the command, the issued command that defines the viewport for the image of the mono view to a first command, for a fixed-function unit of the GPU that is different from the shader processor, that defines a viewport for the first image, and a second command, for the fixed-function unit of the GPU, that defines a viewport for the second image.

28. The apparatus of claim 27, wherein the shader processor of the GPU is configured to execute object code of the modified instructions of the vertex shader, and wherein the fixed-function unit of the GPU is configured to execute the first command that defines the viewport for the first image, and the second command that defines the viewport for the second image.

29. The apparatus of claim 27, wherein the first command is configured to constrain the first image to a first portion of a display, and the second command is configured to constrain the second image to a second portion of the display.

30. The apparatus of claim 27, wherein the means for modifying the issued command that defines the viewport for the image further comprises means for shifting or shifting and stretching the viewport for the first image, and means for shifting or shifting and stretching the viewport for the second image.

31. The apparatus of claim 27, wherein the means for modifying the instructions of the vertex shader comprises means for adding an instruction into the vertex shader that modifies at least one clipping coordinate for the image of the mono view.

32. The apparatus of claim 27, wherein the means for modifying the instructions of the vertex shader to include one or more instructions comprises means for only adding an instruction into the vertex shader that modifies one clipping coordinate for the image of the mono view.

33. A non-transitory computer-readable storage medium comprising instructions that, when executed, cause one or more processors to:
   receive instructions for a vertex shader that is designed to generate an image of a mono view and that is to be executed on a shader processor of a graphics processing unit (GPU);
   modify the instructions of the vertex shader to include one or more instructions that cause the vertex shader, when executed on the shader processor of the GPU, to generate graphics content for a first image of a stereoscopic view after a first execution of the vertex shader, and graphics content for a second image of the stereoscopic view after a second execution of the vertex shader;
   issue a command that defines a viewport for the image of the mono view; and
   subsequent to issuing the command, modify the issued command that defines the viewport for the image of the mono view to a first command, for a fixed-function unit of the GPU that is different from the shader processor, that defines a viewport for the first image, and a second command, for the fixed-function unit of the GPU, that defines a viewport for the second image.

34. The non-transitory computer-readable storage medium of claim 33, further comprising instructions to:
   execute, with the shader processor of the GPU, object code of the modified instructions of the vertex shader; and
   execute, with the fixed-function unit of the GPU, the first command that defines the viewport for the first image, and the second command that defines the viewport for the second image.

35. The non-transitory computer-readable storage medium of claim 33, wherein the instructions to modify the issued command that defines the viewport for the image comprise instructions to modify the issued command that defines the viewport for the image of the mono view to the first command that constrains the first image to a first portion of a display, and the second command that constrains the second image to a second portion of the display.

36. The non-transitory computer-readable storage medium of claim 33, wherein the instructions to modify the issued command that defines the viewport for the image further comprises instructions to shift or shift and stretch the viewport for the first image, and shift or shift and stretch the viewport for the second image.

37. The non-transitory computer-readable storage medium of claim 33, wherein the instructions to modify the instructions of the vertex shader comprise instructions to add an instruction into the vertex shader that modifies at least one clipping coordinate for the image of the mono view.

38. The non-transitory computer-readable storage medium of claim 33, wherein the instructions to modify the instructions of the vertex shader to include one or more instructions comprises instructions to only add an instruction into the vertex shader that modifies one clipping coordinate for the image of the mono view.

* * * * *